(12) United States Patent
Vinciarelli et al.

(10) Patent No.: US 11,705,820 B2
(45) Date of Patent: *Jul. 18, 2023

(54) POWER DISTRIBUTION ARCHITECTURE WITH SERIES-CONNECTED BUS CONVERTER

(71) Applicant: Vicor Corporation, Andover, MA (US)

(72) Inventors: Patrizio Vinciarelli, Boston, MA (US); Andrew D'Amico, Marina del Rey, CA (US)

(73) Assignee: VICOR CORPORATION, Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,384

(22) Filed: Jul. 26, 2021

(65) Prior Publication Data

US 2022/0052609 A1 Feb. 17, 2022

Related U.S. Application Data

(63) Continuation of application No. 16/781,070, filed on Feb. 4, 2020, now Pat. No. 11,075,583, which is a
(Continued)

(51) Int. Cl.
*H02M 3/335* (2006.01)
*H02M 3/158* (2006.01)
*H02M 1/00* (2006.01)

(52) U.S. Cl.
CPC ....... *H02M 3/33576* (2013.01); *H02M 3/158* (2013.01); *H02M 3/33561* (2013.01);
(Continued)

(58) Field of Classification Search
CPC .................................................. H02M 3/33576
(Continued)

(56) References Cited

U.S. PATENT DOCUMENTS 443,441 A 12/1890 Hanson
1,181,803 A 5/1916 Sargent
(Continued)

FOREIGN PATENT DOCUMENTS

CA 1181803 A 1/1985
CA 2042274 A1 12/1991
(Continued)

OTHER PUBLICATIONS

"Electronics Life" magazine excerpts, Mar. 1995, pp. 45-52 (English not available).
(Continued)

*Primary Examiner* — Joseph Chang
(74) *Attorney, Agent, or Firm* — Foley & Lardner LLP

(57) ABSTRACT

Apparatus for power conversion are provided. One apparatus includes a power converter including an input circuit and an output circuit. The power converter is configured to receive power from a source for providing power at a DC source voltage $V_S$. The power converter is adapted to convert power from the input circuit to the output circuit at a substantially fixed voltage transformation ratio $K_{DC} = V_{OUT}/V_{IN}$ at an output current, wherein $V_{IN}$ is an input voltage and $V_{OUT}$ is an output voltage. The input circuit and at least a portion of the output circuit are connected in series across the source, such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

33 Claims, 7 Drawing Sheets

Related U.S. Application Data continuation of application No. 16/022,636, filed on Jun. 28, 2018, now Pat. No. 10,594,223, which is a continuation of application No. 13/933,252, filed on Jul. 2, 2013, now Pat. No. 10,199,950.

(52) U.S. Cl.
CPC ........ *H02M 1/0058* (2021.05); *H02M 1/0064* (2021.05); *H02M 1/0093* (2021.05)

(58) Field of Classification Search
USPC .......................................................... 307/31
See application file for complete search history.

(56) References Cited

U.S. PATENT DOCUMENTS

| | | |
|---|---|---|
| 2,042,274 A | 5/1936 | Pollock |
| 2,497,534 A | 2/1950 | Campbell |
| 2,852,730 A | 9/1958 | Henry |
| 2,902,862 A | 9/1959 | Twiford |
| 2,953,738 A | 9/1960 | Bright |
| 3,008,068 A | 11/1961 | Jacobus et al. |
| 3,008,506 A | 11/1961 | Hicks |
| 3,029,398 A | 4/1962 | McComb |
| 3,083,328 A | 3/1963 | Paul et al. |
| 3,141,140 A | 7/1964 | Rich |
| 3,146,406 A | 8/1964 | Jacobus |
| 3,161,837 A | 12/1964 | Lloyd |
| 3,174,042 A | 3/1965 | Effner |
| 3,229,111 A | 1/1966 | Rudolf et al. |
| 3,241,035 A | 3/1966 | Rhyne |
| 3,295,042 A | 12/1966 | Evalds et al. |
| 3,307,073 A | 2/1967 | McLaughlin |
| 3,313,996 A | 4/1967 | Lingle |
| 3,343,073 A | 9/1967 | Orland |
| 3,400,325 A | 9/1968 | Webb |
| 3,435,375 A | 3/1969 | Miller |
| 3,443,194 A | 5/1969 | Cielo |
| 3,448,370 A | 6/1969 | Harrigan |
| 3,454,853 A | 7/1969 | Hawkins et al. |
| 3,458,798 A | 7/1969 | Frang et al. |
| 3,459,957 A | 8/1969 | Kelley |
| 3,471,747 A | 10/1969 | Gershen |
| 3,495,157 A | 2/1970 | Nercessian |
| 3,506,908 A | 4/1970 | Resch |
| 3,514,692 A | 5/1970 | Lingle |
| 3,517,301 A | 6/1970 | Huber |
| 3,553,428 A | 1/1971 | McGhee |
| 3,564,393 A | 2/1971 | Williamson |
| 3,569,818 A | 3/1971 | Dahlinger et al. |
| 3,573,483 A | 4/1971 | White |
| 3,573,494 A | 4/1971 | Houpt et al. |
| 3,573,508 A | 4/1971 | Harris |
| 3,573,544 A | 4/1971 | Zonis et al. |
| 3,573,597 A | 4/1971 | Genuit et al. |
| 3,579,026 A | 5/1971 | Paget |
| 3,581,186 A | 5/1971 | Weinberger |
| 3,582,754 A | 6/1971 | Hoffmann et al. |
| 3,582,758 A | 6/1971 | Gunn |
| 3,584,289 A | 6/1971 | Bishop et al. |
| 3,588,595 A | 6/1971 | Silvers |
| 3,599,073 A | 8/1971 | Wilson et al. |
| 3,604,920 A | 9/1971 | Niles |
| 3,619,713 A | 11/1971 | Biega et al. |
| 3,629,648 A | 12/1971 | Brown et al. |
| 3,629,725 A | 12/1971 | Chun |
| 3,638,099 A | 1/1972 | Centala |
| 3,643,152 A | 2/1972 | Matsumura et al. |
| 3,646,395 A | 2/1972 | De Pratti |
| 3,657,631 A | 4/1972 | Martens et al. |
| 3,660,672 A | 5/1972 | Berger et al. |
| 3,663,941 A | 5/1972 | Pasciutti |
| 3,665,203 A | 5/1972 | Barnett |
| 3,668,508 A | 6/1972 | Archer et al. |
| 3,684,891 A | 8/1972 | Sieron |
| 3,696,286 A | 10/1972 | Ule |
| 3,704,381 A | 11/1972 | Nercessian |
| 3,710,231 A | 1/1973 | Baker |
| 3,714,545 A | 1/1973 | Chiffert |
| 3,733,538 A | 5/1973 | Kernick et al. |
| 3,735,235 A | 5/1973 | Hamilton et al. |
| 3,737,755 A | 6/1973 | Calkin et al. |
| 3,742,242 A | 6/1973 | Morio et al. |
| 3,743,861 A | 7/1973 | Bolmgren |
| 3,751,676 A | 8/1973 | Igarashi et al. |
| 3,753,071 A | 8/1973 | Engel et al. |
| 3,753,076 A | 8/1973 | Zelina |
| 3,754,177 A | 8/1973 | O'Reilly |
| 3,757,195 A | 9/1973 | Sklaroof |
| 3,769,545 A | 10/1973 | Crane |
| 3,771,040 A | 11/1973 | Fletcher et al. |
| 3,781,505 A | 12/1973 | Steigerwald |
| 3,781,638 A | 12/1973 | Anderson et al. |
| 3,787,730 A | 1/1974 | Ray et al. |
| 3,805,094 A | 4/1974 | Orlando |
| 3,816,810 A | 6/1974 | Friedman et al. |
| 3,818,237 A | 6/1974 | Straus |
| 3,818,312 A | 6/1974 | Luursema et al. |
| 3,820,008 A | 6/1974 | Guarnaschelli |
| 3,824,450 A | 7/1974 | Johnson et al. |
| 3,845,404 A | 10/1974 | Trilling |
| 3,848,175 A | 11/1974 | Demarest |
| 3,851,240 A | 11/1974 | Walker et al. |
| 3,851,278 A | 11/1974 | Isono |
| 3,859,638 A | 1/1975 | Hume |
| 3,873,846 A | 3/1975 | Morio et al. |
| 3,879,647 A | 4/1975 | Hamilton et al. |
| 3,879,652 A | 4/1975 | Billings |
| 3,904,950 A | 9/1975 | Judd et al. |
| 3,909,695 A | 9/1975 | Peck |
| 3,909,700 A | 9/1975 | Ferro |
| 3,912,940 A | 10/1975 | Vince |
| 3,913,002 A | 10/1975 | Steigerwald et al. |
| 3,913,036 A | 10/1975 | Hook |
| 3,916,289 A | 10/1975 | Lynch |
| 3,919,656 A | 11/1975 | Sokal et al. |
| 3,927,363 A | 12/1975 | Mitchell et al. |
| 3,930,196 A | 12/1975 | Park et al. |
| 3,932,764 A | 1/1976 | Corey |
| 3,938,024 A | 2/1976 | Clarke |
| 3,940,682 A | 2/1976 | Park et al. |
| 3,949,238 A | 4/1976 | Brookes |
| 3,959,716 A | 5/1976 | Gilbert et al. |
| 3,974,397 A | 8/1976 | Killough |
| 3,976,932 A | 8/1976 | Collins |
| 3,986,052 A | 10/1976 | Hunter |
| 3,986,097 A | 10/1976 | Woods |
| 3,989,995 A | 11/1976 | Peterson |
| 3,991,319 A | 11/1976 | Servos et al. |
| 4,005,335 A | 1/1977 | Perper |
| 4,007,413 A | 2/1977 | Fisher et al. |
| 4,010,381 A | 3/1977 | Fickenscher et al. |
| 4,011,518 A | 3/1977 | Irvine et al. |
| 4,017,746 A | 4/1977 | Miller |
| 4,017,783 A | 4/1977 | Assow et al. |
| 4,017,784 A | 4/1977 | Simmons et al. |
| 4,027,228 A | 5/1977 | Collins |
| 4,037,271 A | 7/1977 | Keller |
| 4,044,268 A | 8/1977 | Hammel et al. |
| 4,051,445 A | 9/1977 | Boschert |
| 4,058,369 A | 11/1977 | Bentley et al. |
| 4,060,757 A | 11/1977 | McMurray |
| 4,066,945 A | 1/1978 | Korte, Jr. |
| 4,074,182 A | 2/1978 | Weischedel |
| 4,078,247 A | 3/1978 | Albrecht |
| 4,104,539 A | 8/1978 | Hase |
| 4,106,084 A | 8/1978 | Gibert |
| 4,109,192 A | 8/1978 | Burbank et al. |
| 4,114,048 A | 9/1978 | Hull et al. |
| 4,115,704 A | 9/1978 | Hannemann et al. |
| 4,122,359 A | 10/1978 | Breikss |
| 4,126,793 A | 11/1978 | De Vries |
| 4,128,868 A | 12/1978 | Gamble |
| 4,131,860 A | 12/1978 | Fyot |

(56) References Cited

U.S. PATENT DOCUMENTS

| | | |
|---|---|---|
| 4,140,959 A | 2/1979 | Powell |
| 4,150,423 A | 4/1979 | Boschert |
| 4,177,389 A | 12/1979 | Schott |
| 4,184,197 A | 1/1980 | Cuk et al. |
| 4,187,458 A | 2/1980 | Milberger et al. |
| 4,194,147 A | 3/1980 | Payne et al. |
| 4,205,368 A | 5/1980 | Erche et al. |
| 4,207,475 A | 6/1980 | Nercessian |
| 4,208,594 A | 6/1980 | Guicheteau |
| 4,208,706 A | 6/1980 | Suzuki et al. |
| 4,209,710 A | 6/1980 | Quarton |
| 4,210,858 A | 7/1980 | Ford et al. |
| 4,210,958 A | 7/1980 | Ikenoue et al. |
| 4,238,690 A | 12/1980 | Clarke |
| 4,238,691 A | 12/1980 | Ebert, Jr. |
| 4,241,261 A | 12/1980 | Ebert, Jr. |
| 4,245,194 A | 1/1981 | Fahlen et al. |
| 4,245,286 A | 1/1981 | Paulkovich et al. |
| 4,251,857 A | 2/1981 | Shelly |
| 4,253,136 A | 2/1981 | Nanko |
| 4,254,459 A | 3/1981 | Belson |
| 4,257,087 A | 3/1981 | Cuk |
| 4,257,089 A | 3/1981 | Ravis |
| 4,262,214 A | 4/1981 | Patel |
| 4,268,476 A | 5/1981 | Raible |
| 4,270,164 A | 5/1981 | Wyman et al. |
| 4,270,165 A | 5/1981 | Carpenter et al. |
| 4,272,806 A | 6/1981 | Metzger |
| 4,274,133 A | 6/1981 | Cuk et al. |
| 4,275,317 A | 6/1981 | Frosch et al. |
| 4,276,594 A | 6/1981 | Morley |
| 4,277,726 A | 7/1981 | Burke |
| 4,277,728 A | 7/1981 | Stevens |
| 4,288,739 A | 9/1981 | Nercessian |
| 4,288,865 A | 9/1981 | Graham |
| 4,292,581 A | 9/1981 | Tan |
| 4,293,902 A | 10/1981 | White |
| 4,293,904 A | 10/1981 | Brooks et al. |
| 4,297,590 A | 10/1981 | Vail |
| 4,300,191 A | 11/1981 | Baranowski et al. |
| 4,301,496 A | 11/1981 | Schwarz |
| 4,302,803 A | 11/1981 | Shelly |
| 4,307,441 A | 12/1981 | Bello |
| 4,310,771 A | 1/1982 | Wyatt et al. |
| 4,313,060 A | 1/1982 | Fickenscher et al. |
| 4,315,207 A | 2/1982 | Apfel |
| 4,316,097 A | 2/1982 | Reynolds |
| 4,317,056 A | 2/1982 | Alberts |
| 4,318,007 A | 3/1982 | Rizzi |
| 4,318,164 A | 3/1982 | Onodera et al. |
| 4,322,817 A | 3/1982 | Kuster |
| 4,323,787 A | 4/1982 | Sato et al. |
| 4,323,788 A | 4/1982 | Smith |
| 4,323,962 A | 4/1982 | Steigerwald |
| 4,325,017 A | 4/1982 | Schade, Jr. |
| 4,327,298 A | 4/1982 | Burgin |
| 4,328,482 A | 5/1982 | Belcher et al. |
| 4,330,816 A | 5/1982 | Imazeki et al. |
| 4,334,263 A | 6/1982 | Adachi |
| 4,336,587 A | 6/1982 | Boettcher et al. |
| 4,344,122 A | 8/1982 | Jones |
| 4,344,124 A | 8/1982 | Panicali |
| 4,346,342 A | 8/1982 | Carollo |
| 4,347,558 A | 8/1982 | Kalinsky |
| 4,353,113 A | 10/1982 | Billings |
| 4,355,884 A | 10/1982 | Honda et al. |
| 4,356,541 A | 10/1982 | Ikenoue et al. |
| 4,357,654 A | 11/1982 | Ikenoue et al. |
| 4,368,409 A | 1/1983 | Sivanesan et al. |
| 4,371,919 A | 2/1983 | Andrews et al. |
| 4,381,457 A | 4/1983 | Wiles |
| 4,386,394 A | 5/1983 | Kocher et al. |
| 4,393,316 A | 7/1983 | Brown |
| 4,395,639 A | 7/1983 | Bring |
| 4,398,156 A | 8/1983 | Aaland |
| 4,399,499 A | 8/1983 | Butcher et al. |
| 4,403,269 A | 9/1983 | Carroll |
| 4,415,960 A | 11/1983 | Clark, Jr. |
| 4,423,341 A | 12/1983 | Shelly |
| 4,427,899 A | 1/1984 | Bruns |
| 4,438,411 A | 3/1984 | Rubin et al. |
| 4,441,070 A | 4/1984 | Davies et al. |
| 4,442,339 A | 4/1984 | Mizuno et al. |
| 4,443,840 A | 4/1984 | Geissler et al. |
| 4,449,173 A | 5/1984 | Nishino et al. |
| 4,449,174 A | 5/1984 | Ziesse |
| 4,449,175 A | 5/1984 | Ishii et al. |
| 4,451,743 A | 5/1984 | Suzuki et al. |
| 4,451,876 A | 5/1984 | Ogata |
| 4,465,966 A | 8/1984 | Long et al. |
| 4,471,289 A | 9/1984 | Duley et al. |
| 4,473,756 A | 9/1984 | Brigden et al. |
| 4,476,399 A | 10/1984 | Yoshida et al. |
| 4,479,175 A | 10/1984 | Gille et al. |
| 4,484,084 A | 11/1984 | Cheffer |
| 4,499,531 A | 2/1985 | Bray |
| 4,504,895 A | 3/1985 | Steigerwald |
| 4,519,024 A | 5/1985 | Federico et al. |
| 4,520,296 A | 5/1985 | Lepper et al. |
| 4,523,265 A | 6/1985 | Deprez |
| 4,524,411 A | 6/1985 | Willis |
| 4,524,413 A | 6/1985 | Ikenoue et al. |
| 4,527,228 A | 7/1985 | Chi Yu |
| 4,528,459 A | 7/1985 | Wiegel |
| 4,533,986 A | 8/1985 | Jones |
| 4,535,399 A | 8/1985 | Szepesi |
| 4,536,700 A | 8/1985 | Bello et al. |
| 4,538,073 A | 8/1985 | Freige et al. |
| 4,538,101 A | 8/1985 | Shimpo et al. |
| 4,539,487 A | 9/1985 | Ishii |
| 4,546,421 A | 10/1985 | Bello et al. |
| 4,553,039 A | 11/1985 | Stifter |
| 4,556,802 A | 12/1985 | Harada et al. |
| 4,561,046 A | 12/1985 | Kuster |
| 4,562,522 A | 12/1985 | Adams et al. |
| 4,564,800 A | 1/1986 | Jurjans |
| 4,566,059 A | 1/1986 | Gallios et al. |
| 4,571,551 A | 2/1986 | Trager |
| 4,575,640 A | 3/1986 | Martin |
| 4,578,631 A | 3/1986 | Smith |
| 4,584,635 A | 4/1986 | Macinnis et al. |
| 4,586,119 A | 4/1986 | Sutton |
| 4,587,604 A | 5/1986 | Nerone |
| 4,591,782 A | 5/1986 | Germer |
| 4,593,213 A | 6/1986 | Vesce et al. |
| 4,605,999 A | 8/1986 | Bowman et al. |
| 4,607,195 A | 8/1986 | Valkestijn et al. |
| 4,607,323 A | 8/1986 | Sokal et al. |
| 4,618,919 A | 10/1986 | Martin, Jr. |
| 4,621,313 A | 11/1986 | Kiteley |
| 4,622,511 A | 11/1986 | Moore |
| 4,622,629 A | 11/1986 | Glennon |
| 4,626,982 A | 12/1986 | Huber |
| 4,628,426 A | 12/1986 | Steigerwald |
| 4,635,179 A | 1/1987 | Carsten |
| 4,638,175 A | 1/1987 | Bradford et al. |
| 4,642,475 A | 2/1987 | Fischer et al. |
| 4,642,743 A | 2/1987 | Radcliffe |
| 4,644,440 A | 2/1987 | Kenny et al. |
| 4,648,017 A | 3/1987 | Nerone |
| 4,651,020 A | 3/1987 | Kenny et al. |
| 4,652,769 A | 3/1987 | Smith et al. |
| 4,659,942 A | 4/1987 | Volp |
| 4,663,699 A | 5/1987 | Wilkinson |
| 4,670,661 A | 6/1987 | Ishikawa |
| 4,672,517 A | 6/1987 | Mandelcorn |
| 4,672,518 A | 6/1987 | Murdock |
| 4,672,528 A | 6/1987 | Park et al. |
| 4,674,019 A | 6/1987 | Martinelli |
| 4,675,796 A | 6/1987 | Gautherin et al. |
| 4,677,311 A | 6/1987 | Morita |
| 4,677,534 A | 6/1987 | Okochi |
| 4,680,688 A | 7/1987 | Inou et al. |
| 4,680,689 A | 7/1987 | Payne et al. |

(56) References Cited

U.S. PATENT DOCUMENTS

| | | |
|---|---|---|
| 4,683,528 A | 7/1987 | Snow et al. |
| 4,685,039 A | 8/1987 | Inou et al. |
| 4,688,160 A | 8/1987 | Fraidlin |
| 4,691,273 A | 9/1987 | Kuwata et al. |
| 4,694,384 A | 9/1987 | Steigerwald et al. |
| 4,694,386 A | 9/1987 | De Sartre |
| 4,695,935 A | 9/1987 | Oen et al. |
| 4,697,136 A | 9/1987 | Ishikawa |
| 4,698,738 A | 10/1987 | Miller et al. |
| 4,706,177 A | 11/1987 | Josephson |
| 4,709,316 A | 11/1987 | Ngo et al. |
| 4,709,318 A | 11/1987 | Gephart et al. |
| 4,716,514 A | 12/1987 | Patel |
| 4,717,833 A | 1/1988 | Small |
| 4,727,308 A | 2/1988 | Huljak et al. |
| 4,727,469 A | 2/1988 | Kammiller |
| 4,730,242 A | 3/1988 | Divan |
| 4,733,102 A | 3/1988 | Nakayama et al. |
| 4,734,839 A | 3/1988 | Barthold |
| 4,734,844 A | 3/1988 | Rhoads |
| 4,734,924 A | 3/1988 | Yahata et al. |
| 4,745,299 A | 5/1988 | Eng et al. |
| 4,745,538 A | 5/1988 | Cross et al. |
| 4,747,034 A | 5/1988 | Dickey |
| 4,748,550 A | 5/1988 | Okado |
| 4,754,160 A | 6/1988 | Ely |
| 4,754,161 A | 6/1988 | Fox |
| 4,760,276 A | 7/1988 | Lethellier |
| 4,763,237 A | 8/1988 | Wieczorek |
| 4,768,141 A | 8/1988 | Hubertus et al. |
| 4,772,994 A | 9/1988 | Harada et al. |
| 4,777,382 A | 10/1988 | Reingold |
| 4,777,575 A | 10/1988 | Yamato et al. |
| 4,779,185 A | 10/1988 | Musil |
| 4,782,241 A | 11/1988 | Baker et al. |
| 4,783,728 A | 11/1988 | Hoffman |
| 4,785,387 A | 11/1988 | Lee et al. |
| 4,788,450 A | 11/1988 | Wagner |
| 4,788,634 A | 11/1988 | Schlecht et al. |
| 4,794,506 A | 12/1988 | Hino et al. |
| 4,796,173 A | 1/1989 | Steigerwald |
| 4,800,479 A | 1/1989 | Bupp |
| 4,805,078 A | 2/1989 | Munz |
| 4,809,148 A | 2/1989 | Barn |
| 4,811,191 A | 3/1989 | Miller |
| 4,812,672 A | 3/1989 | Cowan et al. |
| 4,814,962 A | 3/1989 | Magalhaes et al. |
| 4,814,965 A | 3/1989 | Petersen |
| 4,823,249 A | 4/1989 | Garcia, II |
| 4,825,348 A | 4/1989 | Steigerwald et al. |
| 4,829,216 A | 5/1989 | Rodriguez-Cavazos |
| 4,841,160 A | 6/1989 | Yon et al. |
| 4,853,832 A | 8/1989 | Stuart |
| 4,853,837 A | 8/1989 | Gulczynski |
| 4,855,858 A | 8/1989 | Boertzel et al. |
| 4,855,888 A | 8/1989 | Henze et al. |
| 4,860,184 A | 8/1989 | Tabisz et al. |
| 4,860,185 A | 8/1989 | Brewer et al. |
| 4,860,188 A | 8/1989 | Bailey et al. |
| 4,860,189 A | 8/1989 | Hitchcock |
| 4,864,479 A | 9/1989 | Steigerwald et al. |
| 4,864,483 A | 9/1989 | Divan |
| 4,866,588 A | 9/1989 | Rene |
| 4,866,589 A | 9/1989 | Satoo et al. |
| 4,868,729 A | 9/1989 | Suzuki |
| 4,870,555 A | 9/1989 | White |
| 4,873,616 A | 10/1989 | Fredrick et al. |
| 4,873,618 A | 10/1989 | Fredrick et al. |
| 4,877,972 A | 10/1989 | Sobhani et al. |
| 4,881,014 A | 11/1989 | Okochi |
| 4,882,646 A | 11/1989 | Genuit |
| 4,882,664 A | 11/1989 | Pennington |
| 4,882,665 A | 11/1989 | Choi et al. |
| 4,885,674 A | 12/1989 | Varga et al. |
| 4,890,210 A | 12/1989 | Myers |
| 4,890,214 A | 12/1989 | Yamamoto |
| 4,893,227 A | 1/1990 | Gallios et al. |
| 4,893,228 A | 1/1990 | Orrick et al. |
| 4,896,092 A | 1/1990 | Flynn |
| 4,899,271 A | 2/1990 | Seiersen |
| 4,900,885 A | 2/1990 | Inumada |
| 4,902,508 A | 2/1990 | Badylak et al. |
| 4,903,183 A | 2/1990 | Noguchi et al. |
| 4,903,189 A | 2/1990 | Ngo et al. |
| 4,908,857 A | 3/1990 | Burns et al. |
| 4,916,599 A | 4/1990 | Traxler et al. |
| 4,920,470 A | 4/1990 | Clements |
| 4,922,397 A | 5/1990 | Heyman |
| 4,922,404 A | 5/1990 | Ludwig et al. |
| 4,924,170 A | 5/1990 | Henze |
| 4,926,303 A | 5/1990 | Sturgeon |
| 4,929,605 A | 5/1990 | Domet et al. |
| 4,931,918 A | 6/1990 | Inou et al. |
| 4,935,857 A | 6/1990 | Nguyen et al. |
| 4,937,468 A | 6/1990 | Shekhawat et al. |
| 4,952,849 A | 8/1990 | Fellows et al. |
| 4,953,068 A | 8/1990 | Henze |
| 4,958,268 A | 9/1990 | Nagagata et al. |
| 4,959,764 A | 9/1990 | Bassett |
| 4,959,766 A | 9/1990 | Jain |
| 4,961,128 A | 10/1990 | Bloom |
| 4,975,823 A | 12/1990 | Rilly et al. |
| 4,982,149 A | 1/1991 | Shimanuki |
| 5,001,318 A | 3/1991 | Noda |
| 5,006,782 A | 4/1991 | Pelly |
| 5,008,795 A | 4/1991 | Parsley et al. |
| 5,010,261 A | 4/1991 | Steigerwald |
| 5,012,401 A | 4/1991 | Barlage |
| 5,013,980 A | 5/1991 | Stephens et al. |
| 5,016,245 A | 5/1991 | Lobjinski et al. |
| 5,017,800 A | 5/1991 | Divan |
| 5,019,717 A | 5/1991 | McCurry et al. |
| 5,019,719 A | 5/1991 | King |
| 5,019,954 A | 5/1991 | Bourgeault et al. |
| 5,023,766 A | 6/1991 | Laidler |
| 5,027,002 A | 6/1991 | Thornton |
| 5,027,264 A | 6/1991 | Dedoncker et al. |
| 5,029,062 A | 7/1991 | Capel |
| 5,036,452 A | 7/1991 | Loftus |
| 5,038,264 A | 8/1991 | Steigerwald |
| 5,038,265 A | 8/1991 | Paladel |
| 5,038,266 A | 8/1991 | Callen et al. |
| 5,041,777 A | 8/1991 | Riedger |
| 5,043,859 A | 8/1991 | Korman et al. |
| 5,047,911 A | 9/1991 | Sperzel et al. |
| 5,055,722 A | 10/1991 | Latos et al. |
| 5,057,698 A | 10/1991 | Widener et al. |
| 5,057,986 A | 10/1991 | Henze et al. |
| 5,063,338 A | 11/1991 | Capel et al. |
| 5,063,489 A | 11/1991 | Inaba |
| 5,066,900 A | 11/1991 | Bassett |
| 5,073,848 A | 12/1991 | Steigerwald et al. |
| 5,077,486 A | 12/1991 | Marson et al. |
| 5,079,686 A | 1/1992 | Vinciarelli |
| 5,097,403 A | 3/1992 | Smith |
| 5,099,406 A | 3/1992 | Harada et al. |
| 5,101,336 A | 3/1992 | Willocx et al. |
| 5,103,110 A | 4/1992 | Housworth et al. |
| 5,103,387 A | 4/1992 | Rosenbaum et al. |
| 5,105,351 A | 4/1992 | Harada et al. |
| 5,111,372 A | 5/1992 | Kameyama et al. |
| 5,111,374 A | 5/1992 | Lai et al. |
| 5,113,334 A | 5/1992 | Tuson et al. |
| 5,113,337 A | 5/1992 | Steigerwald |
| 5,119,013 A | 6/1992 | Sabroff |
| 5,119,283 A | 6/1992 | Steigerwald et al. |
| 5,119,284 A | 6/1992 | Fisher et al. |
| 5,122,726 A | 6/1992 | Elliott et al. |
| 5,122,945 A | 6/1992 | Marawi |
| 5,126,651 A | 6/1992 | Gauen |
| 5,128,603 A | 7/1992 | Wolfel |
| 5,132,888 A | 7/1992 | Lo et al. |
| 5,132,889 A | 7/1992 | Hitchcock et al. |
| 5,138,184 A | 8/1992 | Keefe |

(56) References Cited

U.S. PATENT DOCUMENTS

| | | |
|---|---|---|
| 5,138,249 A | 8/1992 | Capel |
| 5,140,509 A | 8/1992 | Murugan |
| 5,140,512 A | 8/1992 | O'Sullivan |
| 5,140,514 A | 8/1992 | Tuusa et al. |
| 5,144,547 A | 9/1992 | Masamoto |
| 5,146,394 A | 9/1992 | Ishii et al. |
| 5,157,269 A | 10/1992 | Jordan et al. |
| 5,159,541 A | 10/1992 | Jain |
| 5,161,241 A | 11/1992 | Kanai |
| 5,162,663 A | 11/1992 | Combs et al. |
| 5,164,609 A | 11/1992 | Poppe et al. |
| 5,168,435 A | 12/1992 | Kobayashi et al. |
| 5,173,846 A | 12/1992 | Smith |
| 5,177,675 A | 1/1993 | Archer |
| 5,179,512 A | 1/1993 | Fisher et al. |
| 5,206,800 A | 4/1993 | Smith |
| 5,208,740 A | 5/1993 | Ehsani |
| 5,216,351 A | 6/1993 | Shimoda |
| 5,218,522 A | 6/1993 | Phelps et al. |
| 5,221,887 A | 6/1993 | Gulczynski |
| 5,224,025 A | 6/1993 | Divan et al. |
| 5,233,509 A | 8/1993 | Ghotbi |
| 5,235,502 A | 8/1993 | Vinciarelli et al. |
| 5,237,208 A | 8/1993 | Tominaga et al. |
| 5,237,606 A | 8/1993 | Ziermann |
| 5,254,930 A | 10/1993 | Daly |
| 5,255,174 A | 10/1993 | Murugan |
| 5,264,736 A | 11/1993 | Jacobson |
| 5,267,135 A | 11/1993 | Tezuka et al. |
| 5,267,137 A | 11/1993 | Goebel |
| 5,268,830 A | 12/1993 | Loftus, Jr. |
| 5,272,612 A | 12/1993 | Harada et al. |
| 5,272,613 A | 12/1993 | Buthker |
| 5,274,539 A | 12/1993 | Steigerwald et al. |
| 5,274,543 A | 12/1993 | Loftus, Jr. |
| 5,289,364 A | 2/1994 | Sakurai |
| 5,303,138 A | 4/1994 | Rozman |
| 5,304,875 A | 4/1994 | Smith |
| 5,305,191 A | 4/1994 | Loftus, Jr. |
| 5,305,192 A | 4/1994 | Bonte et al. |
| 5,343,383 A | 8/1994 | Shinada et al. |
| 5,353,212 A | 10/1994 | Loftus, Jr. |
| 5,355,077 A | 10/1994 | Kates |
| 5,355,293 A | 10/1994 | Carlstedt |
| 5,355,294 A | 10/1994 | De Doncker et al. |
| 5,363,323 A | 11/1994 | Lange |
| 5,377,090 A | 12/1994 | Steigerwald |
| 5,383,858 A | 1/1995 | Reilly et al. |
| 5,386,359 A | 1/1995 | Nochi |
| 5,396,412 A | 3/1995 | Barlage |
| 5,398,182 A | 3/1995 | Crosby |
| 5,400,239 A | 3/1995 | Caine |
| 5,410,467 A | 4/1995 | Smith et al. |
| 5,412,308 A | 5/1995 | Brown |
| 5,412,557 A | 5/1995 | Lauw |
| 5,424,932 A | 6/1995 | Inou et al. |
| 5,428,523 A | 6/1995 | McDonnal |
| 5,430,632 A | 7/1995 | Meszlenyi |
| 5,430,633 A | 7/1995 | Smith |
| 5,434,770 A | 7/1995 | Dreifuerst et al. |
| 5,438,499 A | 8/1995 | Bonte et al. |
| 5,442,534 A | 8/1995 | Cuk et al. |
| 5,448,469 A | 9/1995 | Rilly et al. |
| 5,461,301 A | 10/1995 | Truong |
| 5,477,091 A | 12/1995 | Fiorina et al. |
| 5,481,178 A | 1/1996 | Wilcox et al. |
| 5,481,449 A | 1/1996 | Kheraluwala et al. |
| 5,500,791 A | 3/1996 | Kheraluwala et al. |
| 5,513,092 A | 4/1996 | Goebel |
| 5,514,921 A | 5/1996 | Steigerwald |
| 5,519,599 A | 5/1996 | Shinada et al. |
| 5,528,480 A | 6/1996 | Kikinis et al. |
| 5,528,482 A | 6/1996 | Rozman |
| 5,530,635 A | 6/1996 | Yashiro |
| 5,534,768 A | 7/1996 | Chavannes et al. |
| 5,535,112 A | 7/1996 | Vazquez Lopez et al. |
| 5,537,021 A | 7/1996 | Weinberg et al. |
| 5,539,630 A | 7/1996 | Pietkiewicz et al. |
| 5,539,631 A | 7/1996 | Partridge |
| 5,541,827 A | 7/1996 | Allfather |
| 5,552,695 A | 9/1996 | Schwartz |
| 5,559,423 A | 9/1996 | Harman |
| 5,559,682 A | 9/1996 | Kanouda et al. |
| 5,570,276 A | 10/1996 | Cuk et al. |
| 5,576,940 A | 11/1996 | Steigerwald et al. |
| 5,590,032 A | 12/1996 | Bowman et al. |
| 5,594,629 A | 1/1997 | Steigerwald |
| 5,621,621 A | 4/1997 | Lilliestrale |
| 5,625,541 A | 4/1997 | Rozman |
| 5,635,826 A | 6/1997 | Sugawara |
| 5,636,107 A | 6/1997 | Lu et al. |
| 5,636,116 A | 6/1997 | Milavec et al. |
| 5,663,876 A | 9/1997 | Newton et al. |
| 5,663,877 A | 9/1997 | Dittli et al. |
| 5,663,887 A | 9/1997 | Warn et al. |
| 5,691,870 A | 11/1997 | Gebara |
| 5,708,571 A | 1/1998 | Shinada |
| 5,719,754 A | 2/1998 | Fraidlin et al. |
| 5,726,869 A | 3/1998 | Yamashita et al. |
| 5,729,444 A | 3/1998 | Perol |
| 5,734,563 A | 3/1998 | Shinada |
| 5,736,843 A | 4/1998 | Amin |
| 5,742,491 A | 4/1998 | Bowman et al. |
| 5,745,359 A | 4/1998 | Faulk |
| 5,754,414 A | 5/1998 | Hanington |
| 5,757,625 A | 5/1998 | Schoofs |
| 5,757,627 A | 5/1998 | Faulk |
| 5,768,118 A | 6/1998 | Faulk et al. |
| 5,771,160 A | 6/1998 | Seong |
| 5,774,350 A | 6/1998 | Notaro et al. |
| 5,781,420 A | 7/1998 | Xia et al. |
| 5,781,421 A | 7/1998 | Steigerwald et al. |
| 5,784,266 A | 7/1998 | Chen |
| 5,805,432 A | 9/1998 | Zaitsu et al. |
| 5,818,704 A | 10/1998 | Martinez |
| 5,831,839 A | 11/1998 | Pansier |
| 5,841,641 A | 11/1998 | Faulk |
| 5,841,643 A | 11/1998 | Schenkel |
| 5,862,042 A | 1/1999 | Jiang |
| 5,870,299 A | 2/1999 | Rozman |
| 5,872,705 A | 2/1999 | Loftus et al. |
| 5,880,939 A | 3/1999 | Sardat |
| 5,880,949 A | 3/1999 | Melhem et al. |
| 5,894,412 A | 4/1999 | Faulk |
| 5,901,052 A | 5/1999 | Strijker |
| 5,903,452 A | 5/1999 | Yang |
| 5,907,481 A | 5/1999 | Svardsjo |
| 5,916,313 A | 6/1999 | Brown |
| 5,929,692 A | 7/1999 | Carsten |
| 5,946,202 A | 8/1999 | Balogh |
| 5,946,207 A | 8/1999 | Schoofs |
| 5,949,658 A | 9/1999 | Thottuvelil et al. |
| 5,956,242 A | 9/1999 | Majid et al. |
| 5,956,245 A | 9/1999 | Rozman |
| 5,959,370 A | 9/1999 | Pardo |
| 5,991,167 A | 11/1999 | Van Lerberghe |
| 5,999,417 A | 12/1999 | Schlecht |
| 6,002,597 A | 12/1999 | Rozman |
| 6,005,773 A | 12/1999 | Rozman et al. |
| 6,011,703 A | 1/2000 | Boylan et al. |
| 6,016,258 A | 1/2000 | Jain et al. |
| 6,016,261 A | 1/2000 | De Wit et al. |
| RE36,571 E | 2/2000 | Rozman |
| 6,026,005 A | 2/2000 | Abdoulin |
| 6,038,148 A | 3/2000 | Farrington et al. |
| 6,046,920 A | 4/2000 | Cazabat et al. |
| 6,058,026 A | 5/2000 | Rozman |
| 6,066,943 A | 5/2000 | Hastings et al. |
| 6,069,799 A | 5/2000 | Bowman et al. |
| 6,069,804 A | 5/2000 | Ingman et al. |
| 6,084,792 A | 7/2000 | Chen et al. |
| 6,087,817 A | 7/2000 | Varga |
| 6,088,329 A | 7/2000 | Lindberg et al. |
| 6,091,616 A | 7/2000 | Jacobs et al. |

(56) References Cited

U.S. PATENT DOCUMENTS

| | | |
|---|---|---|
| 6,137,697 A | 10/2000 | Tarodo et al. |
| 6,137,698 A | 10/2000 | Yukawa et al. |
| 6,141,224 A | 10/2000 | Xia et al. |
| 6,169,675 B1 | 1/2001 | Shimamori et al. |
| 6,191,964 B1 | 2/2001 | Boylan et al. |
| 6,208,535 B1 | 3/2001 | Parks |
| 6,211,657 B1 | 4/2001 | Goluszek |
| 6,222,742 B1 | 4/2001 | Schlecht |
| 6,246,592 B1 | 6/2001 | Balogh et al. |
| 6,252,781 B1 | 6/2001 | Rinne et al. |
| 6,278,621 B1 | 8/2001 | Xia et al. |
| RE37,510 E | 1/2002 | Bowman et al. |
| 6,385,059 B1 | 5/2002 | Telefus et al. |
| 6,417,653 B1 | 7/2002 | Massie et al. |
| 6,421,262 B1 | 7/2002 | Saxelby et al. |
| 6,430,071 B1 | 8/2002 | Haneda |
| RE37,889 E | 10/2002 | Rozman |
| RE37,898 E | 11/2002 | Seragnoli |
| 6,477,065 B2 | 11/2002 | Parks |
| 6,487,093 B1 | 11/2002 | Vogman |
| 6,504,267 B1 | 1/2003 | Giannopoulos |
| 6,535,407 B1 | 3/2003 | Zaitsu |
| 6,552,917 B1 | 4/2003 | Bourdillon |
| 6,580,258 B2 | 6/2003 | Wilcox et al. |
| 6,594,159 B2 | 7/2003 | Schlecht |
| 6,608,768 B2 | 8/2003 | Sula |
| 6,696,882 B1 | 2/2004 | Markowski et al. |
| 6,700,365 B2 | 3/2004 | Isham et al. |
| 6,721,192 B1 | 4/2004 | Yang et al. |
| 6,728,118 B1 | 4/2004 | Chen et al. |
| 6,731,520 B2 | 5/2004 | Schlecht |
| 6,735,094 B2 | 5/2004 | Steigerwald et al. |
| 6,804,125 B2 | 10/2004 | Brkovic |
| 6,836,415 B1 | 12/2004 | Yang et al. |
| 6,845,019 B2 | 1/2005 | Kim et al. |
| 6,853,563 B1 | 2/2005 | Yang et al. |
| 6,853,568 B2 | 2/2005 | Li et al. |
| 6,862,194 B2 | 3/2005 | Yang et al. |
| 6,862,198 B2 | 3/2005 | Muegge et al. |
| 6,927,987 B2 | 8/2005 | Farrington et al. |
| 6,930,893 B2 | 8/2005 | Vinciarelli |
| 6,970,366 B2 | 11/2005 | Apeland et al. |
| 6,987,679 B2 | 1/2006 | Gan et al. |
| 7,019,997 B2 | 3/2006 | Ooishi |
| 7,031,128 B2 | 4/2006 | Nam |
| 7,035,120 B2 | 4/2006 | Tobita |
| 7,050,309 B2 | 5/2006 | Farrington |
| 7,055,309 B2 | 6/2006 | Plote et al. |
| 7,072,190 B2 | 7/2006 | Schlecht |
| 7,145,786 B2 | 12/2006 | Vinciarelli |
| 7,187,562 B2 | 3/2007 | Stojcic et al. |
| 7,269,034 B2 | 9/2007 | Schlecht |
| 7,272,023 B2 | 9/2007 | Schlecht |
| RE40,438 E | 7/2008 | Urakawa et al. |
| 7,501,715 B2 | 3/2009 | Saeueng et al. |
| 7,558,083 B2 | 7/2009 | Schlecht |
| 7,564,702 B2 | 7/2009 | Schlecht |
| 7,727,021 B2 | 6/2010 | Haruna et al. |
| 7,746,041 B2 | 6/2010 | Xu et al. |
| 7,768,801 B2 | 8/2010 | Usui et al. |
| 8,023,290 B2 | 9/2011 | Schlecht |
| 8,493,751 B2 | 7/2013 | Schlecht |
| 8,582,333 B2 | 11/2013 | Oraw et al. |
| 10,374,505 B2 | 8/2019 | Wood |
| 10,594,223 B1 | 3/2020 | Vinciarelli et al. |
| 11,075,583 B1 * | 7/2021 | Vinciarelli ........ H02M 3/33576 |
| 2003/0007372 A1 | 1/2003 | Porter et al. |
| 2003/0174522 A1 | 9/2003 | Xu et al. |
| 2005/0047177 A1 | 3/2005 | Tobita |
| 2006/0209572 A1 | 9/2006 | Schlecht |
| 2006/0262575 A1 | 11/2006 | Schlecht et al. |
| 2006/0285368 A1 | 12/2006 | Schlecht |
| 2008/0175024 A1 | 7/2008 | Schlecht et al. |
| 2008/0211304 A1 | 9/2008 | Farrington et al. |
| 2009/0051221 A1 | 2/2009 | Liu et al. |
| 2010/0091526 A1 | 4/2010 | Schlecht |
| 2011/0176333 A1 | 7/2011 | Schlecht et al. |
| 2014/0085939 A1 | 3/2014 | Schlecht |
| 2021/0155104 A1 | 5/2021 | Skutt et al. |

FOREIGN PATENT DOCUMENTS

| | | |
|---|---|---|
| EP | 0 165 37 B1 | 11/1983 |
| EP | 0 418 83 A1 | 9/1984 |
| EP | 0 779 58 B1 | 1/1986 |
| EP | 0 584 00 B1 | 5/1986 |
| EP | 0 184 963 A2 | 6/1986 |
| EP | 0 223 504 B1 | 5/1987 |
| EP | 0 102 614 B1 | 7/1987 |
| EP | 0 139 870 B1 | 11/1987 |
| EP | 0 244 186 A2 | 11/1987 |
| EP | 0 289 196 A2 | 11/1988 |
| EP | 0 343 855 A2 | 11/1989 |
| EP | 0 410 866 A1 | 1/1991 |
| EP | 0 449 504 A2 | 10/1991 |
| EP | 0 467 778 A2 | 1/1992 |
| EP | 0 472 261 A2 | 2/1992 |
| EP | 0 481 466 A1 | 4/1992 |
| EP | 0 484 610 A1 | 5/1992 |
| EP | 0 291 403 B1 | 1/1993 |
| EP | 0 549 920 A1 | 7/1993 |
| EP | 0 550 167 A2 | 7/1993 |
| EP | 0 582 814 A2 | 2/1994 |
| EP | 0 588 569 A2 | 3/1994 |
| EP | 0 257 817 B1 | 4/1994 |
| EP | 0 336 725 B1 | 7/1994 |
| EP | 0 605 752 A2 | 7/1994 |
| EP | 0 608 091 A2 | 7/1994 |
| EP | 0 610 158 A1 | 8/1994 |
| EP | 0 616 281 A2 | 9/1994 |
| EP | 0 622 891 A2 | 11/1994 |
| EP | 0 549 920 B1 | 8/1995 |
| EP | 0 665 634 B1 | 8/1995 |
| EP | 0 687 058 A1 | 12/1995 |
| EP | 0 428 377 B1 | 1/1996 |
| EP | 0 694 826 A2 | 1/1996 |
| EP | 0 696 831 A2 | 2/1996 |
| EP | 0 529 180 B1 | 3/1996 |
| EP | 0 474 471 B1 | 5/1996 |
| EP | 0 709 949 A2 | 5/1996 |
| EP | 0 476 278 B1 | 6/1996 |
| EP | 0 720 278 A1 | 7/1996 |
| EP | 0 736 959 A1 | 10/1996 |
| EP | 0 741 447 A2 | 11/1996 |
| EP | 0 595 232 B1 | 1/1997 |
| EP | 0 599 814 B1 | 4/1997 |
| EP | 0 848 485 A2 | 6/1998 |
| EP | 0 508 664 B1 | 7/1998 |
| EP | 0 429 310 B1 | 9/1998 |
| EP | 0 757 428 B1 | 11/1998 |
| EP | 0 575 626 B1 | 12/1998 |
| EP | 0 884 829 A1 | 12/1998 |
| EP | 0 503 806 B1 | 5/1999 |
| EP | 0 944 162 A1 | 9/1999 |
| EP | 0 954 088 A1 | 11/1999 |
| EP | 0 973 246 A1 | 1/2000 |
| EP | 0 996 219 A2 | 4/2000 |
| EP | 0 618 666 B1 | 2/2001 |
| EP | 0 925 638 B1 | 10/2001 |
| EP | 0 798 846 B1 | 1/2002 |
| EP | 0 932 929 B1 | 8/2002 |
| EP | 0 851 566 B1 | 3/2003 |
| EP | 0 805 540 B1 | 6/2004 |
| EP | 0 854 564 B1 | 3/2008 |
| EP | 1 231 705 B1 | 8/2010 |
| FR | 2535133 A1 | 4/1984 |
| FR | 2608857 A1 | 5/1989 |
| GB | 2 217 931 A | 1/1900 |
| GB | 2 110 493 A | 6/1983 |
| GB | 2 117 144 A | 10/1983 |
| GB | 2 131 238 A | 6/1984 |

(56) References Cited

FOREIGN PATENT DOCUMENTS

| | | |
|---|---|---|
| GB | 2 160 722 A | 12/1985 |
| GB | 2 233 479 A | 1/1991 |
| GB | 2 244 155 A | 11/1991 |
| GB | 2 255 865 A | 11/1992 |
| GB | 2 291 287 A | 1/1996 |
| GB | 2 313 495 A | 11/1997 |
| JP | S6149583 A | 3/1986 |
| JP | 61-273171 A | 12/1986 |
| JP | 61-277372 A | 12/1986 |
| JP | 62-233067 A | 10/1987 |
| JP | 63-257458 A | 10/1988 |
| JP | 63-277471 A | 11/1988 |
| JP | S6450762 A | 2/1989 |
| JP | H01-278265 | 11/1989 |
| JP | H01-283061 | 11/1989 |
| JP | H02-155465 A | 6/1990 |
| JP | H02-202362 A | 8/1990 |
| JP | H02-246774 A | 10/1990 |
| JP | H318275 A | 1/1991 |
| JP | H389851 A | 4/1991 |
| JP | 04-105556 A | 4/1992 |
| JP | H05-064446 A | 3/1993 |
| JP | 05-199744 A | 8/1993 |
| JP | 05-207745 A | 8/1993 |
| JP | 06-098540 A | 4/1994 |
| JP | 06-187056 A | 7/1994 |
| JP | 06-315263 A | 11/1994 |
| JP | 06-339266 A | 12/1994 |
| JP | H06-343262 | 12/1994 |
| JP | 07-007928 A | 1/1995 |
| JP | 07-115766 A | 5/1995 |
| JP | 07-194104 A | 7/1995 |
| JP | 07-308062 A | 11/1995 |
| JP | 07-337005 A | 12/1995 |
| JP | 07-337006 A | 12/1995 |
| JP | 08-019251 A | 1/1996 |
| JP | 08-205533 A | 8/1996 |
| JP | 08-223906 A | 8/1996 |
| JP | 08-275518 A | 10/1996 |
| JP | 08-289538 A | 11/1996 |
| JP | 08-336282 A | 12/1996 |
| JP | 09-093917 A | 4/1997 |
| JP | 09-172775 A | 6/1997 |
| JP | 09-182416 A | 7/1997 |
| JP | H07-337005 | 12/1997 |
| JP | 10-066336 A | 3/1998 |
| JP | 10-136646 A | 5/1998 |
| JP | 10-146054 A | 5/1998 |
| JP | 10-210740 A | 8/1998 |
| JP | 10-248248 A | 9/1998 |
| JP | 11-004577 A | 1/1999 |
| JP | 11-069803 A | 3/1999 |
| JP | 11-103572 A | 4/1999 |
| JP | 11-146650 A | 5/1999 |
| JP | H11-134989 | 5/1999 |
| JP | 11-178335 A | 7/1999 |
| JP | 2004-254393 A | 9/2004 |
| PL | 177578 B3 | 5/1997 |
| WO | WO-84/04634 A1 | 11/1984 |
| WO | WO-86/02787 A1 | 5/1986 |
| WO | WO-87/05165 A1 | 8/1987 |
| WO | WO-88/09084 A1 | 11/1988 |
| WO | WO-89/01719 A1 | 2/1989 |
| WO | WO-91/07803 A1 | 5/1991 |
| WO | WO-95/23451 A1 | 8/1995 |
| WO | WO-95/30182 A1 | 11/1995 |
| WO | WO-95/32458 A2 | 11/1995 |
| WO | WO-98/11658 A1 | 3/1998 |
| WO | WO-98/18198 A1 | 4/1998 |
| WO | WO-98/26496 A1 | 6/1998 |
| WO | WO-98/33267 A3 | 9/1998 |
| WO | WO-01/97371 A1 | 12/2001 |
| WO | WO-2004/082119 A2 | 9/2004 |
| WO | WO-2005/008872 A1 | 1/2005 |
| ZA | 9711503 B | 6/1998 |

OTHER PUBLICATIONS

"Electronics Life" magazine excerpts, Nov. 1995, pp. 81-90 (English not available).

"Thomas Financial, Venture Economics' Venture Capital Financings, Portfolio Company Report," 2 pages (2007).

Abe, et al., "Stability Improvement of Distributed Power System by Using Full-Regulated Bus Converter," 31st Annual Conference of IEEE Industrial Electronics Society, pp. 2549-2553 (2005).

Abe, et al., "System Stability of Full-Regulated Bus Converter in Distributed Power System," INTELEC 05—Twenty-Seventh International Telecommunications Conference, pp. 563-568 (2005).

Abramczyk, et al., "MOSPOWER Applications Handbook," Siliconix Incorporated, 248 pages (1984).

Abramovitz & Ben-Yaakov, "A Novel Self-Oscillating Synchronously-Rectified DC-DC Converter," PESC '91 Record: 22nd Annual IEEE Power Electronics Specialists Conference, pp. 163-170 (1991).

Acker, et al., "Current-Controlled Synchronous Rectification," Proceedings of 1994 IEEE Applied Power Electronics Conference and Exposition, pp. 185-191 (1994).

Acker, et al., "Synchronous rectification with adaptive timing control," Proceedings of PESC '95—Power Electronics Specialist Conference, pp. 88-95 (1995).

Aguilar, et al., "An Improved Battery Charger/Discharger Topology with Power Factor Correction," IV IEEE International Power Electronics Congress. Technical Proceedings, pp. 2-7, (1995).

Ahn, et al., "Clamp Mode Forward ZVS-MRC with Self-Driven Synchronous Rectifier," Proceedings of Intelec'96—International Telecommunications Energy Conference, pp. 470-475 (1996).

Alou, et al., "A High Efficiency Voltage Regulator Module with Single Winding Self-Driven Synchronous Rectification," IEEE 31st Annual Power Electronics Specialists Conference Proceedings, pp. 1510-1515 (2000).

Alou, et al., "Design of a low output voltage DC/DC converter for Telecom application with a new scheme for Self-Driven Synchronous Rectification," Fourteenth Annual Applied Power Electronics Conference and Exposition. 1999 Conference Proceedings, pp. 866-872 (1999).

Alou, et al., "Design of a 1,5V Output Voltage On-Board DC/DC Converter with Magnetic Components Integrated in a Multilater PCB," Proceedings of APEC 97—Applied Power Electronics Conference, pp. 764-769 (1997).

Alvarez, "Control of Multi-Switch Multi-Output Power Converters," Massachusetts Institute of Technology, Master of Science Thesis, 32 pages (1988).

Alvarez-Barcia, et al., "Low Power Multioutput Converter with Post-Regulation based on Synchronous Rectification and Windings Integrated in the PCB," Thirteenth Annual Applied Power Electronics Conference and Exposition, pp. 191-197 (1998).

Andreycak, "Power Management Solution Delivers Efficient Multiple Outputs," Power Electronics Technology, retrieved from http://www.printthis.clickability.com/pt/cpt?action=cpt&title=Power+Management+Solution, 5 pages (2001).

Arduini, "A Distributed Power System with a Low-Cost Universal DC/DC Converter," Power Conversion Electronics Sep. 1995 Proceedings, pp. 315-322 (1995).

Artesyn, "Chapter 1: Principles of Power Conversion," Amtex Electronics Pty. Ltd., 17 pages (n.d.).

Artesyn, "Quarter-Brick IBC Series Application Note 190," 9 pages (2007).

Ashdown & Poulin, "Distributed power-a solution for the 90s," Proceedings of Intelec 93: 15th International Telecommunications Energy Conference, pp. 47-51 (1993).

Astec, "Astec AMPSS Modular Power Supply System," PowerPoint presentation, 99 pages (n.d.).

Balogh, "Design Review: 140W, Multiple Output High Density DC/DC Converter," Texas Instruments Power Supply Design Seminar—Seminar 1200, Topic 6, 24 pages (1997).

Balogh, "Design Review: 100W, 400kHz, DC/DC Converter With Current Doubler Synchronous Rectification Achieves 92% Efficiency," Texas Instruments Seminar 1100 Topic 2, pp. 2-1-2-26 (2001).

(56) References Cited

OTHER PUBLICATIONS

Balogh, "The Performance Of The Current Doubler Rectifier with Synchronous Rectification," Technical Papers of the Tenth International High Frequency Power Conversion Conference, pp. 216-225 (1995).
Balogh, et al., "Unique Cascaded Power Converter Topology for High Current Low Output Voltage Applications," Texas Instruments Seminar 1300 Topic 1, 24 pages (1999).
Barlage, "Synchronous Rectification and Regulation in Multiple Cross Regulated Outputs," Technical Papers of the Ninth International High Frequency Power Conversion 1994 Conference, pp. 185-193 (1994).
Barry, "Design issues in regulated and unregulated intermediate bus converters," Nineteenth Annual IEEE Applied Power Electronics Conference and Exposition, pp. 1389-1394 (2004).
Betty & Batarseh, "Topical overview of soft-switching PWM high frequency converters," Proceedings of Southcon '95, pp. 47-52 (1995).
Bel Power Products, "Bus Converter 48V Input / 9.4V Output / 36A Datasheet," 7 pages (2004).
Bel Power Products, "Isolated DC/DC Converters: 48 VDC Input; 12VDC/27 A Output, 1/4 Brick-0RCM-27S12L," 3 pages (2008).
Belopolsky & Dassatti, "Hybrid Technologies for High Frequency Switching Power Supplies," Proceedings of the 41st Electronic Components & Technology Conference, pp. 103-108 (1991).
Berkowitz, et al., "A Distributed Power Architecture for the System 75 Digital Communications System," INTELEC '84—International Telecommunications Energy Conference, pp. 130-134 (1984).
Billings, "Handbook of Switchmode Power Supplies," McGraw-Hill Publishing Company, 340 pages (1989).
Bindra, "Two-Stage Conversion Redefines Distributed Power Architecture," Power Electronics Technology, 3 pages (2003).
Blake, et al., "Synchronous Rectifiers Versus Schottky Diodes: A Comparison of the Losses of a Sychronous Rectifier Versus the Losses of a Schottky Diode Rectifier," Proceedings of 1994 IEEE Applied Power Electronics Conference and Exposition, pp. 17-23 (1994).
Blanc & Thibodeau, "Use of Enhancement- And Depletion-Mode Mosfets in Sychronous Rectification," Proceedings of The Power Electronics Show & Conference, pp. 1-8 (1986).
Blanc, "Practical Application of MOSFET Synchronous Rectifiers," Proceedings of the Thirteenth International Telecommunications Energy Conference—INTELEC 91, pp. 494-501 (1991).
Blanchard & Stevens, "MOSFETs Move in on Low Voltage Rectification," Official Proceedings of the Ninth International PCI, pp. 213-222 (1984).
Blanchard & Thibodeau, "The design of a high efficiency, low voltage power supply using MOSFET synchronous rectification and current mode control," 1985 IEEE Power Electronics Specialists Conference, pp. 355-361 (1985).
Boschert, "3T Family User Information Sheet," Boschert Incorporated, 1 page (1982).
Boschert, "Boschert: An International Leader in Switching Power Supplies," 24 pages (n.d.).
Boschert, "Marketing Brochure," 15 pages (n.d.).
Boschert, "Switching Power Supplies Test Result—Model 3T12AP, PN 10484," 1 page (n.d.).
Bowles & Paul, "Modelling Interference Properties of SMPS DC Power Distribution Busses," National Symposium on Electromagnetic Compatibility, pp. 119-126 (1989).
Bowman, et al., "A High Density Board Mounted Power Module for Distributed Powering Architectures," Fifth Annual Proceedings on Applied Power Electronics Conference and Exposition, pp. 43-54 (1990).
Brakus, "DC/DC Modules for Low Voltage Applications: The New Generation of Board Mounted Modules in Thick-Copper Multilayer Technology," INTELEC—Twentieth International Telecommunications Energy Conference, pp. 392-397 (1998).
Briskman, et al., "COMSAT Technical Review, vol. 7, No. 1, Spring 1977," Communications Satellite Corporation, 176 pages (1977).

Brown, "Addressing the topologies, converters, and switching devices for intermediate bus architectures," 2005 European Conference on Power Electronics and Applications, 9 pages (2005).
Brush, "Distributed power architecture demand characteristics," Nineteenth Annual IEEE Applied Power Electronics Conference and Exposition, pp. 342-345 (2004).
Burns, et al., "An Intelligent, Fault Tolerant, High Power, Distributed Power System for Massively Parallel Processing Computers," Proceedings of the Ninth Annual Applied Power Electronics Conference and Exposition—ASPEC'94, pp. 795-800 (1994).
Burr-Brown, "Isolated, Unregulated DC/DC Converters," Burr Brown Corporation, PWS727 & PWS728, 8 pages (1989).
Cao & Peng, "A family of zero current switching switched-capacitor dc-dc converters," Twenty-Fifth Annual IEEE Applied Power Electronics Conference and Exposition, pp. 1365-1372 (2010).
Cao & Peng, "Zero-Current-Switching Multilevel Modular Switched-Capacitor DC-DC Converter," IEEE Transactions on Industry Applications 46(6), pp. 2536-2544 (2010).
Carbone, "Distributed Power Tags Keep Falling," Electronics Purchasing, 1 page,(1996).
Carpenter, et al., "A Distributed Power System for Military VLSI Applications," Technical Papers of the Third International High Frequency Power Conversion 1988 Conference, pp. 430-441 (1988).
Carr & Franco, "X2000 Power System Architecture," Proceedings of the Thirty-Second Intersociety Energy Conversion Engineering Conference, pp. 381-386 (1997).
Carsten, "Distributed Power Systems of the Future Utilizing High Frequency Converters," Technical Papers of the Second International High Frequency Power Conversion Conference, pp. 1-14 (1987).
Carsten, "VLSI & VHSIC Power System Design Considerations," Proceedings off the Twelfth International PCI Conference, pp. 1-15 (1986).
Casey & Schlecht, "A high-frequency, low volume, point-of-load power supply for distributed power systems," Proceedings of the 18th Annual IEEE Power Electronics Specialists Conference, pp. 439-450 (1987).
Casey, "Circuit Design for 1-10 MHZ DC-DC Conversion," MIT Doctoral Thesis, 109 pages (1989).
Celestica, "Proposal for Celestica FixedRatio Product Family," 18 pages (2002).
Cervera, et al., "A High-Efficiency Resonant Switched Capacitor Converter With Continuous Conversion Ratio," IEEE Transactions on Power Electronics 30(3), pp. 1373-1382 (2015).
Chen & Shih, "New Multi-Output Switching Converters with MOSFET-Rectifier Post Regulators," IEEE Transactions on Industrial Electronics 45(4), pp. 609-616 (1998).
Chen, "Resonant Switched Capacitor DC-DC Converter with Stackable Conversion Ratios," Electrical Engineering and Computer Sciences, Univ. of California at Berkeley, Technical Report No. UCB/EECS-2016-187, 21 pages (2016).
Chen, et al., "A resonant MOSFET gate driver with efficient energy recovery," IEEE Transactions on Power Electronics 19(2), pp. 470-477 (2004).
Chen, et al., "Design of a High-Efficiency, Low-Profile Forward Converter with 3.3-v Output," 1995 VPEC Seminar Proceedings, pp. 105-112 (1995).
Chen, et al., "Design of High Efficiency, Low Profile, Low Voltage Converter with Integrated Magnetics," Proceedings of APEC 97—Applied Power Electronics Conference, pp. 911-917 (1997).
Cheng, "Comparative Study of AC/DC Converters for More Electric Aircraft," Power Electronics and Variable Speed Drives, Conference Publication No. 456, pp. 299-304 (1998).
Cho & Choi, "Analysis and Design of Multi-Stage Distributed Power Systems," Proceedings] Thirteenth International Telecommunications Energy Conference—INTELEC 91, pp. 55-61 (1991).
Choi & Cho, "Intermediate Line Filter Design to Meet Both Impedance Compatibility and EMI Specifications," IEEE Transactions on Power Electronics 10(5), pp. 583-588 (1995).
Choi, "Dynamics and Control of Switchmode Power Conversions in Distributed Power Systems," Virginia Polytechnic Institute and State University Thesis, 200 pages (1992).

(56) References Cited

OTHER PUBLICATIONS

Choi, et al., "The stacked power system: a new power conditioning architecture for mainframe computer systems," IEEE Transactions on Power Electronics 9(6), pp. 616-623 (1994).
Cobos & Uceda, "Low output voltage DC/DC conversion," Proceedings of IECON'94—20th Annual Conference of IEEE Industrial Electronics, pp. 1676-1681 (1994).
Cobos, et al., "Active Clamp PWM Forward Converter with Self Driven Synchronous Rectification," Proceedings of Intelec 93: 15th International Telecommunications Energy Conference, pp. 200-206 (1993).
Cobos, et al., "Comparison of High Efficiency Low Output Voltage Forward Topologies," Proceedings of 1994 Power Electronics Specialist Conference—PESC'94, pp. 887-894 (1994).
Cobos, et al., "Low voltage power electronics," Journal of Circuits, Systems, and Computers 5(4), pp. 575-588 (1995).
Cobos, et al., "New Driving Scheme for Self Driven Synchronous Rectifiers," Fourteenth Annual Applied Power Electronics Conference and Expedition, pp. 840-846 (1999).
Cobos, et al., "Optimized Synchronous Rectification Stage for Low Output Voltage (3.3V) DC/DC Conversion," 25th Annual IEEE Power Electronics Specialists Conference, pp. 902-908 (1994).
Cobos, et al., "RCD Clamp PWM Forward Converter With Self Driven Synchronous Rectification," Proceedings of IECON '93—19th Annual Conference of IEEE Industrial Electronics, pp. 1336-1341 (1993).
Cobos, et al., "Resonant reset forward topologies for low output voltage on board converters," Applied Power Electronics Conference and Exposition, 1994. APEC '94. Conference Proceedings pp. 703-708 (1994).
Cobos, et al., "Self Driven Synchronous Rectification in Resonant Topologies: Forward ZVS-MRC, Forward ZCS-QRC and LCC-PRC," Proceedings of the 1992 International Conference on Industrial Electronics, Control, Instrumentation, and Automation, pp. 185-190 (1992).
Cobos, et al., "Several Alternatives for Low Output Voltage on Board Converters," APEC '98 Thirteenth Annual Applied Power Electronics Conference and Exposition, pp. 163-169 (1998).
Cobos, et al., "Study of the applicability of self-driven synchronous rectification to resonant topologies," PESC '92 Record. 23rd Annual IEEE Power Electronics Specialists Conference, pp. 933-940 (1992).
Croll & Grellet, "Multiple Output DC/DC Zero-Current Switch Quasi-Resonant Converter," Proceedings of Intelec 93: 15th International Telecommunications Energy Conference, pp. 215-220 (1993).
Cutatolo, "Choosing a Power Architecture," IC Master, 4 pages (2004).
De Hoz & De La Cruz, "Analysis and Design of a Zero Current Switched Quasi-Resonant Converter with Synchronous Rectification for Low Output Voltage Applications," PESC '92 Record. 23rd Annual IEEE Power Electronics Specialists Conference, pp. 221-228 (1992).
De La Cruz, et al., "Analysis of Suitable PWM Topologies to Meet Very High Efficiency Requirements for on Board DC/DC Converters in Future Telecom Systems," Proceedings of Intelec 93: 15th International Telecommunications Energy Conference, pp. 207-214 (1993).
De La Cruz, et al., "Performances Comparison of Four Practical Implementations Based on PWM, Quasi and Multiresonant Topologies for on Board DC/DC Converters in Distributed Power Architectures," PESC '92 Record. 23rd Annual IEEE Power Electronics Specialists Conference, pp. 917-925 (1992).
De La Cruz, et al., "Review of Suitable Topologies for on Board DC/DC Converters in Distributed Power Architectures for Telecom Applications," Proceedings of the Fourteenth International Telecommunications Energy Conference, pp. 59-65 (1992).
Delta Electronics, Inc., "Delphi Series E48SB, 240W Eighth Brick Bus Converter DC/DC Power Modules: 48Vin, 12V/20A Out Datasheet," 10 pages (2005).
Diaz, et al., "A New Family of Loss-Less Power MOSFET Drivers," 3rd International Power Electronic Congress. Technical Proceedings. CIEP '94, pp. 43-48 (1994).
Diaz, et al., "A new lossless power MOSFET driver based on simple DC/DC converters," Proceedings of PESC '95—Power Electronics Specialist Conference, pp. 37-43 (1995).
Diazzi & Gattavari, "80W-400W Monolithic Buck Regulators Integrated in Multipower BCD Technology," High Frequency Power Conversion Conference Proceedings, pp. 212-226 (1988).
Dixon, "High Power Factor Preregulators for Off-Line Power Supplies," Unitrode Corporation, 17 pages (2003).
Dwane, et al., "A Resonant High Side Gate Driver for Low Voltage Applications," 2005 IEEE 36th Power Electronics Specialists Conference, pp. 1979-1985 (2005).
Ericsson, "Selection of Architecture for Systems using Bus Converters and POL Converters," Design Note 023, 7 pages (2005).
Ericsson, "The Power Book—3rd Revised Edition (reduced version)," 127 pages (1996).
Farrington, et al., "Comparison of single-ended-parallel MRC and forward MRC," Proceedings of the APEC '92 Seventh Annual Applied Power Electronics Conference and Exposition, pp. 203-210 (1992).
Feng, et al., "A hybrid strategy with Simplified Optimal Trajectory Control for LLC resonant converters," Twenty-Seventh Annual IEEE Applied Power Electronics Conference and Exposition, pp. 1096-1103 (2012).
Ferencz, "A 250 W High Density Point-of-Load Converter," S.B. E.E. Massachusetts Institute of Technology Thesis, 60 pages (1987).
Ferenczi, "Power Supplies, Part B: Switched-Mode Power Supplies," Studies in Electrical and Electronic Engineering, pp. 352-558 (1987).
Ferreira, et al., "A Self Oscillating Bidirectional DC to DC Converter Employing Minimum Circuitry," Third International Conference on Power Electronics and Variable-Speed Drives, pp. 125-129 (1988).
Firek & Kent, "Reduce Load Capacitance in Noise-Sensitive High-Transient Applications, through Implementation of Active Filtering," VICOR PowerBench, 9 pages (2007).
Fisher, et al. "Performance of low loss synchronous rectifiers in a series-parallel resonant dc-dc converter," Proceedings of the Fourth Annual IEEE Applied Power Electronics Conference and Exposition, pp. 240-246 (1989).
Fisher, et al., "A 1 MHz, 100 W commercial, high-density point-of-load power supply using direct-bond copper and surface mount technologies," Fifth Annual Proceedings on Applied Power Electronics Conference and Exposition, pp. 55-63 (1990).
Franz, "Multilevel Simulation Tools for Power Converters," Fifth Annual Proceedings on Applied Power Electronics Conference and Exposition, pp. 629-633 (1990).
Fukumochi, et al., "Synchronous Rectifiers using New Structure MOSFET," Proceedings of International Symposium on Power Semiconductor Devices and IC's: ISPSD '95, pp. 252-255 (1995).
Gachora, "Design of a Four-Phase Switchmode High Efficiency Power Supply," Massachusetts Institute of Technology Thesis, 68 pages (1994).
Garcia, et al., "PCB Based Transformers for Multiple Output DC/DC Converters," IV IEEE International Power Electronics Congress. Technical Proceedings. CIEP 95, pp. 51-55 (1995).
Garcia, et al., "Zero voltage switching in the PWM half bridge topology with complementary control and synchronous rectification," Proceedings of PESC '95—Power Electronics Specialist Conference, pp. 286-291 (1995).
Gaudreau, et al., "Solid-State High Voltage, DC Power Distribution & Control," Proceedings of the 1999 Particle Accelerator Conference, pp. 568-570 (1999).
Gegner, "High Power Factor AC-to-DC Converter Using a Reactive Shunt Regulator," Proceedings of 1994 Power Electronics Specialist Conference—PESC'94, pp. 349-355 (1994).
Ghislanzoni, "Parallel Power Regulation of a Constant Frequency, ZV-ZC Switching Resonant Push-Pull," Proceedings of the European Space Power Conference, pp. 191-198 (1991).
Gillett & Moorman, "Transistor Rectifier-Regulator," IBM Technical Disclosure Bulletin 22(6), pp. 2319-2320 (1979).

(56) References Cited

OTHER PUBLICATIONS

Goodenough, "Building-block converters distribute power throughout large systems," Electronic Design, Jan. 24, 1995, pp. 202-203 (1995).
Goodenough, "Power-Supply Rails Plummet and Proliferate," Electronic Design Jul. 24, 1995, 4 pages (1995).
Gottlieb, "Power Control with Solid State Devices," Reston Publishing Company, Inc., 191 pages (1985).
Gottlieb, "Power Supplies, Switching Regulators, Inverters and Converters, Second Editiion," TAB Books, 242 pages (1985).
Graf, "Converter and Filter Circuits," Butterworth-Heinemann, 98 pages (1997).
Grant & Gowar, "Power MOSFETS: Theory and Applications," John Wiley & Sons, pp. 183-253 (1989).
Greenland & Davies, "A Two Chip Set Achieves Isolation Without Compromising Power Supply Performance," Proceedings of The Power Electronics Show & Conference, pp. 390-395 (1986).
Greenland, "start:DPA developments: A reason for change in power conversion," Power Management DesignLine, retrieved from http://www.powermanagmentdesignline.com/52200069, 4 pages (2004).
Greenland, "Trends in distributed-power architecture," Hearst Electronics Group: Application Reference Materials, 5 pages (2004).
Grossman, "Power Module Lets Users Customize Supplies," Electronic Design for Engineers and Engineering Managers—Worldwide, Jun. 25, 1981, p. 213 (1981).
Gutmann, "Application of RF Circuit Design Principles to Distributed Power Converters," IEEE Transactions on Industrial Electronics and Control Instrumentation 27(3), pp. 156-164 (1980).
Hadjivassilev, et al., "Front-End Converter System for Distributed Power Supply," Fifth European Conference on Power Electronics and Applications, pp. 221-226 (1993).
Hamo, "A 360W, Power Factor Corrected, Off-Line Power Supply, Using the HIP5500," Intersil Intelligent Power No. AS9417, 6 pages (1994).
Harada, et al., "A novel ZVS-PWM half-bridge converter," Proceedings of Intelec 94, pp. 588-593 (1994).
Harada, et al., "Analysis and design of ZVS-PWM half-bridge converter with secondary switches," Proceedings of PESC '95—Power Electronics Specialist Conference, pp. 280-285 (1995).
Harper, et al., "Controlled Synchoronous Rectifier," High Frequency Power Conversion Conference Proceedings, pp. 165-172 (1988).
Hartman, "System Designer's Introduction to Modular DC/DC Converters," Proceedings of the Power Electronics Show & Conference, pp. 185-190 (1988).
Hartman, "System designer's guide to modular dc/dc converters," Electronic Products 30(19), 7 pages (1998).
Heath, "The market for Distributed Power Systems," Proceedings of APEC '91: Sixth Annual Applied Power Electronics Conference and Exhibition, pp. 225-229 (1991).
Hendrix, "The Evolution of Power Management and Conversion," Power Systems Design Europe Mar. 2005, p. 10 (2005).
Higashi, et al., "On the cross-regulation of multi-output resonant converters," PESC '88 Record., 19th Annual IEEE Power Electronics Specialists Conference, pp. 18-25 (1988).
Hsieh, et al., "A Study on Full-Bridge Zero-Voltage Switched PWM Converter: Design and Experimentation," Proceedings of IECON '93—19th Annual Conference of IEEE Industrial Electronics, pp. 1281-1285 (1993).
Hua, et al., "Development of a DC Distributed Power System," Proceedings of 1994 IEEE Applied Power Electronics Conference and Exposition—ASPEC'94, pp. 763-769 (1994).
Huang, "Coordination Design Issues in the Intermediate Bus Architecture," DCDC Technical White Paper from Astec Power, 8 pages (2004).
Huillet, et al., "High Frequency Quasi-Resonant Buck Converter on Insulated Metal Substrate for Avionics Distributed Power Systems," Proceedings of APEC '92: Seventh Annual Applied Power Electronics Conference and Exposition, pp. 647-653 (1992).
Huliehel, et al., "A New Design Approach for Distributed Power Systems," VPEC, pp. 214-218 (1993).
Hunter, "Regulatory and Technological Trends in Power Supplies," 1993 International Symposium on Electromagnetic Compatibility, pp. 10-15 (1993).
IBM "Cross-Coupled Gates Synchronous Rectifier," IBM Technical Disclosure Bulletin 35(4A), pp. 462-463 (1992).
IEEE, "Bus," IEEE Standard Dictionary of Electrical and Electronics Terms, Third Edition, ANSI/IEEE Std 100-1984, 2 pages (1984).
International Rectifier, "International Rectifier Introduces DC Bus Converter Chip Set Re-Defining Distributed Power Architecture for Networking and Communication Systems," 3 pages (2003).
International Search Report for PCT/US1998/001498 dated Jul. 14, 1998, 4 pages.
Intersil, "Intersil's New PWM Controller Advances Power Conversion Performance for Telecom," Business Wire, 3 pages (2004).
Ivensky, et al., "A Resonant DC-DC Transformer," Proceedings of APEC '92: Seventh Annual Applied Power Electronics Conference and Exposition, pp. 731-737 (1992).
Jacobs & Kunzinger, "Distributed Power Architecture Concepts," INTELEC '84—International Telecommunications Energy Conference, pp. 105-109 (1984).
Jamerson & Barker, "1500 Watt Magnetics Design Comparison: Parallel Forward Converter vs. Dual Forward Converter," Technical Papers of the Fifth International High Frequency Power Conversion Conference, pp. 347-358 (1990).
Jamerson, "Post-Regulation Techniques for 100 KHz to 300 KHz Multiple-Output PWM Supplies (Limitations, Trends, and Predictions)," Technical Papers of the Fourth International High Frequency Power Conversion Conference, pp. 260-273 (1989).
Jensen, "An Improved Square-Wave Oscillator Circuit," IRE Transactions on Circuit Theory 4(3), pp. 276-279 (1957).
Ji & Kim, "Active Clamp Forward Converter with MOSFET Synchronous Rectification," Proceedings of 1994 Power Electronics Specialist Conference—PESC'94, pp. 895-901 (1994).
Jitaru & Cocina, "High efficiency DC-DC converter," Proceedings of 1994 IEEE Applied Power Electronics Conference and Exposition—ASPEC'94, pp. 638-644, (1994).
Jitaru, "The Impact of Low Output Voltage Requirements on Power Converters," Technical Papers of the Tenth International High Frequency Power Conversion Conference, pp. 1-10 (1995).
Jitaru, "Zero Voltage PWM, Double Ended Converter," Technical Papers of the Seventh International High Frequency Power Conversion Conference, pp. 394-405 (1992).
Jovanovic, "Evaluation of Synchronous-Rectification Efficiency Improvement Limits in Forward Converters," IEEE Transactions on Industrial Electronics 42(4), pp. 387-395 (1995).
Jovanovic, et al., "Design Considerations for Forward Converter with Synchronous Rectifiers," Virginia Power Electronics Center 1993 Power Electronics Seminar, pp. 163-173 (1993).
Jovanovic, et al., "Distributed Power Systems—Benefits and Challenges," International Journal of Electronics 77(5), pp. 601-612 (1994).
Kagan, et al., "Improving Power Supply Efficiency with MOSFET Synchronous Rectifiers," Proceedings of Powercon 9: Ninth International Solid-State Power Electronics Conference, D-4, 6 pages (1982).
Kang & Upadhyay, "A Parallel Resonant Converter with Postregulators," IEEE Transactions on Power Electronics 7(2), pp. 296-303 (1992).
Kassakian & Schlecht, "High-Frequency High-Density Converters for Distributed Power Supply Systems," Proceedings of the IEEE 76(4), pp. 362-376 (1988).
Kassakian, et al., "Principles of Power Electronics," Addison-Wesley Series in Electrical Engineering, pp. 576-581 (1991).
Kesarwani, et al., "Resonant-Switched Capacitor Converters for Chip-Scale Power Delivery: Design and Implementation," IEEE Transactions on Power Electronics 30(12), pp. 6966-6977 (2015).
Kesarwani, et al., "Resonant switched-capacitor converters for chip-scale power delivery: Modeling and design," 2013 IEEE 14th Workshop on Control and Modeling for Power Electronics (COMPEL), 7 pages (2013).

(56) References Cited

OTHER PUBLICATIONS

Kester & Erisman, "Section 3: Switching Regulators," retrieved from https://www.analog.com/media/en/training-seminars/design-handbooks/Practical-Design-Techniques-Power-Thermal/Section3.pdf, 71 pages (2015).
Klapfish, "Trends in AC/DC Switching Power Supplies and DC/DC Converters," Proceedings of the Eighth Annual Applied Power Electronics Conference and Exposition, pp. 361-365 (1993).
Kociecki, et al., "A High Power-Density DC-DC Converter Board," Second Annual IEEE Applied Power Electronics Conference and Exposition, pp. 169-180 (1987).
Kollman & Chamberlin, "Processor Power Subsystem Architectures," APEC 2000. Fifteenth Annual IEEE Applied Power Electronics Conference and Exposition, pp. 1183-1189 (2000).
Korman, et al., "A Synchronous Rectifier for High-Density Power Supplies," High Frequency Power Conversion Conference Proceedings, pp. 126-139 (1988).
Krauthamer, et al., "High Efficiency Synchronous Rectification in Spacecraft Power Systems," Proceedings of the European Space Power Conference : Graz, Austria, pp. 1-5 (1993).
Krauthamer, et al., "State-of-the-Art of DC Components for Secondary Power Distribution on Space Station Freedom," Fifth Annual IEEE Applied Power Electronics Conference and Exposition (1990).
Krein & Bass, "Autonomous Control Technique for High-Performance Switches," IEEE Transactions on Industrial Electronics 39(3), pp. 215-222 (1992).
Lam, et al., "Revolutionary Advances in Distributed Power Systems," Eighteenth Annual IEEE Applied Power Electronics Conference and Exposition, pp. 30-36 (2003).
Langford-Smith, "Radiotron Designer's Handbook," Wireless Press, pp. 1202-1222, 1496-1497 (1953).
Le, et al., "Design Techniques for Fully Integrated Switched-Capacitor DC-DC Converters," IEEE Journal of Solid-State Circuits 46(9), pp. 2120-2131 (2011).
Lee & Boroyevich, "Center Overview and Highlights," Center for Power Electronics Systems, 71 pages (2007).
Lee & Zhou, "Power Management Issues for Future Generation Microprocessors," 11th International Symposium on Power Semiconductor Devices and ICs. ISPSD'99 Proceedings, pp. 27-33 (1999).
Lei, et al., "A General Method for Analyzing Resonant and Soft-Charging Operation of Switched-Capacitor Converters," IEEE Transactions on Power Electronics 30(10), pp. 5650-5664 (2015).
Lei, et al., "Split-Phase Control: Achieving Complete Soft-Charging Operation of a Dickson Switched-Capacitor Converter," IEEE Transactions on Power Electronics 31(1), pp. 770-782 (2016).
Lemnios, et al., "Low-Power Electronics," IEEE Design & Test of Computers 11(4), pp. 8-13 (1994).
Leu, et al, "A High-Frequency AC Bus Distributed Power System," Virginia Power Electronics Center, 1990 Power Electronics Seminar, pp. 98-107 (1990).
Leu, et al., "Analysis and Design of R-C-D Clamp Forward Converter," High Frequency Power Conversion Conference Proceedings, pp. 198-208 (1992).
Leung, "SPICE Simulation and Modeling of DC-DC Flyback Converter," Massachusetts Institute of Technology Thesis, 65 pages (1995).
Lewis, et al., "Distributed Power System Analysis," Final Report Prepared for IBM Corporation, Contract No. YA-261092, 138 pages (1989).
Lewis, et al., "Modeling, analysis and design of distributed power systems," 20th Annual IEEE Power Electronics Specialists Conference, pp. 152-159 (1989).
Li, et al., "Lossless voltage regulation and control of the resonant switched-capacitor DC-DC converter," 2015 IEEE 16th Workshop on Control and Modeling for Power Electronics (COMPEL), 7 pages (2015).
Liang, et al., "Design Considerations of Power MOSFET for High Frequency Synchronous Rectification," IEEE Transactions on Power Electronics 101(3), pp. 388-395 (1995).
Lindman, "Powering Tomorrow's Data Internetworking Systems," Ericsson Microelectronics, INTELEC. Twenty-Second International Telecommunications Energy Conference, pp. 506-511 (2000).
Lindman, et al., "Applying Distributed Power Modules in Telecom Systems," IEEE Transactions on Power Electronics 11(2), pp. 365-373 (1996).
Lineage Power, "CBQ25 Series," retrieved from http://www.lineagepower.com/oem/cbq25.html, 1 page (2010).
Lineage Power, "QSW025A0B Series Power Modules; DC-DC Converters; 36-75 Vdc Input; 12Vdc Output; 25A Output Current," 16 pages (2009).
Lineage Power, "QUK240 Series Power Modules; DC-DC Converters; 36-75vDC Input; 12Vdc Output; 25A Output Current," 16 pages (2009).
Linera, et al., "Closing the Feedback Loop in the Half-Bridge Complementary-Control DC-to-DC Converter," Proceedings of APEC 97—Applied Power Electronics Conference, pp. 977-982 (1997).
Lingle, "Low Input Voltage D.C. to D.C. Converter, Final Report," National Aeronautics and Space Administration, Contract No. NAS 5-3441, 118 pages (1984).
Lo & Henze, "Development of a DC-to-DC Power Converter for Distributed Power Processing," Proceedings of the Fourth Annual IEEE Applied Power Electronics Conference and Exposition, pp. 413-422 (1989).
Lo, "Cost Analysis of Powering an Optical Customer Access Network," Intelec Fourteenth International Telecommunications Energy Conference, pp. 96-103 (1992).
Lo, et al., "A Compact DC-to-DC Power Converter for Distributed Power Processing," IEEE Transactions on Power Electronics 7(4), pp. 714-724 (1992).
Lucent Technologies, "Data Sheet-NH020-Series Power SIPs: 5 Vdc input; 1.5Vdc Output; 20W," Bell Labs Innovations Data Sheet, 20 pages (1999).
Lucent Technologies, "HW100f and HW100A Power Modules: dc-dc Converters; 36 Vdc to 75 Vdc, 3.3 Vdc or 5 Vdc Output; 100W," Bell Labs Innovations Data Sheet, 16 pages (1999).
Lukasik, "Driving Today's Power Systems," Power Technology: A Special Supplement to EDN, Part Two: Power System Architectures, pp. P13-P18 (2004).
Maksimovic, "A Mos Gate Drive with Resonant Transitions," PESC '91 Record 22nd Annual IEEE Power Electronics Specialists Conference, pp. 527-532 (1991).
Malik, "The Power System Challenge—Understanding the Total Picture," Eighteenth Annual IEEE Applied Power Electronics Conference and Exposition, pp. 202-208 (2003).
Mammano, "Distributed Power Systems," Unitrode Corporation Seminar 900, Topic 1, pp. 1-1-1-12 (1993).
Mammano, "Fueling the Megaprocessors—Empowering Dynamic Energy Management," Unitrode Power Design Seminar, SEM1100 Topic 1, 25 pages (1996).
Mammano, "Isolating the Control Loop," Unitrode Power Supply Design Seminar 700, Topic 2, pp. 2-1-2-16 (1990).
Mankikar, "Power Electronics Industry Newsletter," Power Electronics Industry News, Issue 91, 20 pages (2002).
Mannion, "New Challenges Place Power Squarely in the Spotlight," Electronic Design, Nov. 3, 1997, 8 pages (1997).
Marchetti, "Make a noise for DC-DC converters," Electronic Product Design & Test, retrieved from http://www.epdtonthenet.net/article/17812/Make-a-noise-for-DC-DC-converters.aspx, 2 pages (2008).
Marchetti, "Power Systems Architectures What's In? What's Out?," Battery Power Products & Technology., 2 pages (2003).
Matsuo, "Comparison of Multiple-Output DC-DC Converters using Cross Regulation," 1979 IEEE Power Electronics Specialists Conference, pp. 169-185 (1979).
Maxim, "Power Supplies for Telecom Systems," Maxim Integrated Products Application Note 280, retrieved from http://www.maxim-ic.com/an280, 15 pages (2000).
Maxim, "Synchronous Rectification Aids Low-Voltage Power Supplies," Maxim Integrated Products Application Note 625, retrieved from http://www.maxim-ic.com/appnotes.cfm/an_pk/652, 8 pages (2001).
MC-Service, "Service Manual for Sony DCR-VX1000/VX1000E RMT-803 Sony Digital Video Camera Recorder," with the follow-

(56) References Cited

OTHER PUBLICATIONS ing supplements: "DCR-VX 1000/VX 1000E RMT-803, Service Manual, Supplement-3: Electrical Part Changed," "DCR-VX 1000/VX 1000E RMT-803, Service Manual, Supplement-2: Addition for Bist Check," "DCR-VX 1000/VXI000E RMT-803, Service Manual, Supplement-2: Addition for Bist Check," "DCR-VX 1000/VX 1000E RMT-803, Service Manual, Supplement-1," "DV Mechanical Adjustment Manual 1," 150 page.

McHale, "Complex military systems require efficient power electronics," Military Embedded Systems, retrieved from http://mil-embedded.com/articles/complex-efficient-power-electronics/, 6 pages (2013).

Micro Linear, "Battery Power Control 1C General Description and Features," Data Sheet ML4873, 1 page (1997).

Micro Linear, "Battery Power Control IC," Advanced Data Sheet ML4873, 9 pages (1993).

Miftakhutdinov, "Improving System Efficiency with a New Intermediate-Bus Architecture," Texas Instruments Seminar, Topic 4, 20 pages (2009).

Miles, et al., "Market Trends Toward Enhanced Control of Electronic Power Systems," Proceedings of the Eighth Annual Applied Power Electronics Conference and Exposition, pp. 92-98 (1993).

Miwa, "Hybrid Construction of a 10MHz DC-DC Converter for Distributed Power Systems," Massachusetts Institute of Technology Thesis, 63 pages (1989).

Miwa, "Interleaved Conversion Techniques for High Density Power Supplies," Massachusetts Institute of Technology Thesis, 97 pages (1992).

Miwa, et al., "Copper-Based Hybrid Fabrication of a 50W, 5 MHz 40V-5V DC/DC Converter," Proceedings of the Fourth Annual IEEE Applied Power Electronics Conference and Exposition, pp. 256-264 (1989).

Miwa, et al., "High Efficiency Power Factor Correction Using Interleaving Techniques," Proceedings of APEC '92: Seventh Annual Applied Power Electronics Conference and Exposition, pp. 557-568 (1992).

Mohandes, "MOSFET Synchronous Rectifiers Achieve 90% Efficiency—Part I," Power Conversion & Intelligent Motion, pp. 10-13 (1991).

Mohandes, "MOSFET Synchronous Rectifiers Achieve 90% Efficiency—Part II," Power Conversion & Intelligent Motion, pp. 55-61 (1991).

Moore, "Step-Up/Step-Down Converters Power Small Portable Systems," EDN Magazine, pp. 79-84 (1994).

Moore, "Synchronous rectification aids low-voltage power supplies," EDN Access, retrieved from http://www.edn.eom/archives/1995/042795/09dF4.htm, 7 pages (1995).

Morrison, "Bus Converters Push Power Levels Higher," Electronic Design, retrieved from https://www.electronicdesign.com/content/article/21188217/bus-converters-push-power-levels-higher, 7 pages (2005).

Morrison, "Distributed Power Moves To Intermediate Bus Voltage," Electronic Design 50(19), pp. 55-62 (2002).

Morrison, "Sine Amplitude Converters: A New Class of Topologies for DC-DC Conversion." Electronic Design, retrieved from http://electronicdesign.com/energy/sine-amplitude-converters-new-class-topologies-dc-dc-conversion, 5 pages (2003).

Motto, "Introduction to Solid State Power Electronics," Powerex, Inc., 111 pages (1997).

MPS, "DN0004: 3A Point of Load Power Supplies—MP1570 Design Note," 6 pages (2005).

Mullett, "Practical Design of Small Distributed Power Systems," Power Conversion & Intelligent Motion, pp. 21-27 (1991).

Mullett, "The Role of the Power Source In System Design," Proceedings of the Power Sources Users Conference, 9 pages (1985).

Murakami, et al., "A high-efficiency 30 W board mounted power supply module," Proceedings of the Thirteenth International Telecommunications Energy Conference—INTELEC 91, pp. 122-127 (1991).

Murakami, et al., "A Highly Efficient Low-Profile 300-W Power-Pack for Telecommunications Sytems," Proceedings of 1994 IEEE Applied Power Electronics Conference and Exposition—ASPEC'94, pp. 786-792 (1994).

Murakami, et al., "A Simple and Efficient Synchronous Rectifier for Forward DC-DC Converters," Proceedings of the Eighth Annual Applied Power Electronics Conference and Exposition, pp. 463-468 (1993).

Murata Power Solutions, "EUS34-096 Isolated Bus Converter Datasheet," 3 pages (2008).

Mweene & Ashley, "Communications System Power Supply Designs," Texas Instruments Literature No. SNVA569, 6 pages (2011).

Mweene, "The Design of Front-End DC-DC Converters of Distributed Power Supply Systems with Improved Efficiency and Stability," Massachusetts Institute of Technology Thesis, 184 pages (1992).

Mweene, et al., "A 1 kW, 500 kHz Front-end Converter for Distributed Power Supply System," Proceedings of the Fourth Annual IEEE Applied Power Electronics Conference and Exposition, pp. 423-432 (1989).

Mweene, et al., "A high-efficiency 1.5 kW, 390-50 V half-bridge converter operated at 100% duty-ratio," Proceedings of APEC '92: Seventh Annual Applied Power Electronics Conference and Exposition, pp. 723-730 (1992).

Narveson & Harris, "Power-Management Solutions for Telecom Systems Improve Performance, Cost, and Size," Texas Instruments Incorporated Analog Applications Journal 3Q 2007, pp. 10-13 (2007).

Narveson & Jones, "Why the Market is Ready for a Non-Isolated DC/DC Power Module Standard," Nineteenth Annual IEEE Applied Power Electronics Conference and Exposition, pp. 335-341 (2004).

Narveson, "How Many Isolated DC-DC's Do you Really Need?," Proceedings of Applied Power Electronics Conference. APEC '96, pp. 692-695 (1996).

Narveson, "What is the Right Bus Voltage?," APEC '98: Thirteenth Annual Applied Power Electronics Conference and Exposition, pp. 883-888 (1998).

Newhart, "Product Report on DC-DC Converters," Electronic Design 34(21), pp. 169-170 (1986).

Niemela, et al., "Comparison of GaAs and Silicon Synchronous Rectifiers in a 3.3V Out, 50W DC-DC Converter," PESC Record. 27th Annual IEEE Power Electronics Specialists Conference, pp. 861-867 (1996).

Nochi, et al., "Full-Wave Current Resonant Multi-Output Converters," 21st Annual IEEE Conference on Power Electronics Specialists, pp. 528-535 (1990).

Office Action for U.S. Appl. No. 13/947,893 dated Nov. 21, 2014, 5 pages.

Ollero, et al., "New Post-Regulation and Protection Methods for Multiple Output Power Converters With Synchronous Rectification," Proceedings of Intelec'96—International Telecommunications Energy Conference, pp. 462-469 (1996).

Oraw & Ayyanar, "Load adaptive, high efficiency, switched capacitor intermediate bus converter," INTELEC 07—29th International Telecommunications Energy Conference, pp. 628-635 (2007).

Osifchin, et al., "Evolving Central-Office Powering Architecture," Fifth International Telecommunications Energy Conference, pp. 1-5 (1983).

P.R. Mallory & Co, Inc., "Fundamental Principles of Vibrator Power Supply Design," pp. 9-21, 23-31, 33-47, 49-105, 107-129, 131-135 (1947).

Pagotto, "Distributed Power Supplies, Course Notes for a Seminar Presented During the Power Electronics Conference '90," The Power Electronics Conference, pp. 175-185 (1990).

Panov & Jovanovic, "Design and Performance Evaluation of Low-Voltage/High-Current DC/DC OnBoard Modules," Fourteen Annual Applied Power Electronics Conference and Exposition, pp. 545-552 (1999).

Pedersen, "Low Voltage High Efficiency Power Conversion," Proceedings of the Fifth European Space Power Conference, pp. 51-56 (1998).

(56) References Cited

OTHER PUBLICATIONS

Pepper, "A New High Efficiency Post-Regulation Technique for Multiple Output Converters," Ninth International Solid-State Power Electronics Conference, 10 pages (1982).
Perkinson, "UPS Systems—A Review," Third Annual IEEE Applied Power Electronics Conference and Exposition, pp. 151-154 (1988).
Peterson & Saint-Pierre, "A Half Bridge, Self-Oscillating, Multi-Resonant Converter Circuit," Proceedings of the Eighth Annual Applied Power Electronics Conference and Exposition, pp. 77-84 (1993).
Power One Inc, "Form 10-K (Annual Report): Filed Mar. 12, 2004 for the Period Ending Dec. 31, 2003," Securities and Exchange Commission, 65 pages (2004).
Power One, "SQT54T38096 DC-DC Converter Preliminary Data Sheet," 12 pages (2007).
Pressman, "Chapter 3—Building Block Assembly of Compound Regulating Systems," Switching and Linear Power Supply, Power Converter Design, pp. 74-104 (1977).
Pressman, "Switching and Linear Power Supply, Power Converter Design," Hayden Book Co., 391 pages (1977).
Qian, "Advance Single-Stage Power Factor Correction Techniques," Virginia Polytechnic Institute and State University Thesis, 185 pages (1997).
Ratajczak, "Linear/Switching Supply Isolates, Holds Down Noise," Electronic Design 25, p. 156 (1979).
Ren, "High frequency, high efficiency two-stage approach for future microprocessors," Virginia Polytechnic Institute and State University thesis, 185 pages (2005).
Ren, et al., "A family of high power density unregulated bus converters," IEEE Transactions on Power Electronics 20(5), pp. 1045-1054 (2005).
Ren, et al., "Two-Stage 48V Power Pod Exploration for 64-Bit Microprocessor," Eighteenth Annual IEEE Applied Power Electronics Conference and Exposition, pp. 426-431 (2003).
Ren, et al., "Two-Stage Approach for 12V VR," Nineteenth Annual IEEE Applied Power Electronics Conference and Exposition, pp. 1306-1312 (2004).
Renauer, "Challenges in Powering High Performance Low Voltage Processors," Eleventh Annual Applied Power Electronics Conference and Exposition, pp. 977-983 (1996).
Rittenhouse, et al., "A Low-Voltage Power MOSFET With a Fast-Recovery Body Diode for Synchronous Rectification," 21st Annual IEEE Conference on Power Electronics Specialists, pp. 96-106 (1990).
Roddam, "Transistor Inverters and Converters, Chapters 7-11," D. Van Nostrand Company, pp. 116-204 (1963).
Roddam, "Transistor Inverters and Converters," London Life Books Ltd., 122 pages (1963).
Rodriguez, "Voltage Conversion and Regulation Techniques Employed in the Prime Converter for the Anchored Interplanetary Monitoring Platform (AIMP) Spacecraft," Supplement to IEEE Transactions on Aerospace and Electronics Systems AES-2(6), pp. 466-476 (1966).
Rostek, "Power System Design for Massive Parallel Computer Systems," Ninth Annual Applied Power Electronics Conference and Exposition, pp. 808-814 (1994).
Rozman & Fellhoelter, "Circuit Considerations for Fast, Sensitive Low-Voltage Loads in a Distributed Power System," 1 Proceedings of 1995 IEEE Applied Power Electronics Conference and Exposition—APEC'95, pp. 34-42 (1995).
Rutledge, "Distributed Power 'Time for a Second Look,'" INTELEC '86—International Telecommunications Energy Conference, pp. 369-375 (1986).
Sabolis, "Bus Converters Aim to Boost Efficiency In IBA-Based Power Designs," DATEL Application Note, 6 pages (2003).
Sakai & Harada, "A New Synchronous Rectifier Using Bipolar Transistor Driven by Current Transformer," Proceedings of the Fourteenth International Telecommunications Energy Conference—INTELEC '92, pp. 424-429 (1992).
Sakai & Harada, "Synchronous Rectifier for Low Voltage Switching Converter," Proceedings of INTELEC 95. 17th International Telecommunications Energy Conference, pp. 471-475 (1995).
Sakai, et al., "MOSFET synchronous rectifier with saturable transformer commutation for high frequency converters," Proceedings of IEEE Power Electronics Specialist Conference—PESC '93, pp. 1024-1031 (1993).
Salato, "The Sine Amplitude Converter Topology Provides Superior Efficiency and Power Density in Intermediate Bus Architecture Applications," Vicor White Paper, 7 pages (2011).
Sampson, et al., "Energy Systems Meeting the Requirements for Distributed Telecommunications Systems," Trends in Telecommunications 8(3), pp. 24-32 (n.d.).
Sanders, et al., "The Road to Fully Integrated DC-DC Conversion via the Switched-Capacitor Approach," IEEE Transactions on Power Electronics 28(9), pp. 4146-4155 (2013).
Sano & Fujita, "Performance of a High-Efficiency Switched-Capacitor-Based Resonant Converter With Phase-Shift Control," IEEE Transactions on Power Electronics 26(2), pp. 344-354 (2011).
Sayani & Wanes, "Analyzing and determining optimum on-board power architectures for 48 V-input systems," Eighteenth Annual IEEE Applied Power Electronics Conference and Exposition, pp. 781-785 (2003).
Schlecht, "Choosing an On-Board Power Architecture," Power Technology: A Special Supplement to EDN, Part Two: Power System Architectures, pp. P28-P30 (2004).
Schlecht, "Research Results from the Study of A High Efficiency Highly Manufacturable DC-DC Converter," MIT to IBM Report, 32 pages (n.d.).
Schlect, "The Fundamentals of Switching Regulators and Their Control Circuits," 35 pages (2010).
Schulz, "System Interactions And Design Considerations For Distributed Power Systems," Virginal Polytechnic Institute & State University Thesis, 82 pages (1991).
Schulz, et al., "Design Considerations for a Distributed Power System," 21st Annual IEEE Conference on Power Electronics Specialists, pp. 611-617 (1990).
Schulz, et al., "Integrating a Series of High-Density Converters," PowerTechnics Magazine, pp. 32-37 (1990).
Schwarz, "A Controllable DC Transformer," IEEE Transactions on Magnetics 6(3), pp. 657-658 (1970).
Sebastian, el al., "An Overall Study of the Half-Bridge Complementary-Control DC-to-DC Converter," Proceedings of PESC '95—Power Electronics Specialist Conference, pp. 1229-1235 (1995).
Sebastian, et al., "A Complete Study of the Double Forward-Flyback Converter," PESC '88 Record, 19th Annual IEEE Power Electronics Specialists Conference, pp. 142-149 (1988).
Sebastian, et al., "A Study of the Two-Input DC-to-DC Switching Post-Regulators," V IEEE International Power Electronics Congress Technical Proceedings, CIEP 96, pp. 35-45 (1996).
Sebastian, et al., "Average-Current-Mode Control of Two-Input Buck Postregulators Used in Power-Factor Correctors," IEEE Transactions on Industrial Electronics 46(3), pp. 569-576 (1999).
Sebastian, et al., "Input Current Shaper Based on the Series Connection of a Voltage Source and Loss-Free Resistor," APEC '98 Thirteenth Annual Applied Power Electronics Conference and Exposition, pp. 461-467 (1998).
Sebastian, et al., "Small-Signal Modeling Of The Half-Bridge Complementary-Control DC-to-DC Converter," IV IEEE International Power Electronics Congress. Technical Proceedings. CIEP 95, pp. 44-50 (1995).
Sebastian, et al., "Very Efficient Two-Input DC-to-DC Switching Post-Regulators," PESC Record, 27th Annual IEEE Power Electronics Specialists Conference, pp. 874-880 (1996).
Seeman, et al., "Analysis and Optimization of Switched-Capacitor DC-DC Converters," IEEE Transactions on Power Electronics 23(2), pp. 841-851 (2008).
Severns & Bloom, "Modern DC-To-DC Switchmode Power Converter Circuits," Van Nostrand Reinhold Company, 179 pages (1985).
Severns, "Switchmode Converter Topologies—Make Them Work for You!", Intersil Inc. Application Bulletin A035, 32 pages (1980).

(56) References Cited

OTHER PUBLICATIONS

Severns, "The Power MOSFET As A Rectifier," Power Conversion International, pp. 49-50 (1980).
SGS-Thomson, "Designing with the L296 Monolithic Power Switching Regulator," SGS-Thomson Microelectronics Application Note, 43 pages (1996).
Shepard, "Power Supplies," Reston Publishing Company, pp. 32-37 (1984).
Shi & Brockschmidt, "Fault Tolerant Distributed Power," Proceedings of Applied Power Electronics Conference—APEC '96, pp. 671-677 (1996).
Shoyama & Harada, "Zero-Voltage-Switching by Magnetizing Current of Transformer in Push-Pull DC-DC Converter," Proceedings of the Thirteenth International Telecommunications Energy Conference—INTELEC 91, pp. 640-647 (1991).
Slurzberg & Osterheld, "Essentials of Radio-electronics," McGraw-Hill, pp. 358-362 & 623-624 (1961).
Small Services, Inc., "Who We Are," retrieved from http://www.smallservices.net/, 8 pages (2009).
Smith, "Benefits of the DC Bus Converter in Distributed Power Architectures for Networking & Communications Systems," International Rectifier, 8 pages (2004).
Smith, "Distributed Power Systems Via ASICs Using SMT," Surface Mount Technology, pp. 29-32 (1990).
Steigerwald, "High Density Power for Low Voltage Pulsed Loads," Proceedings of the Eighth Annual Applied Power Electronics Conference and Exposition, pp. 37-43 (1993).
Steigerwald, et al., "Investigation of Power Distribution Architectures for Distributed Avionics Loads," PESC95 Record, vol. 1, 26th Annual IEEE Power Electronics Specialists Conference, 9 pages (1995).
Sun, et al., "Forward Converter Regulator Using Controlled Transformer," IEEE Transactions on Power Electronics 11(2), pp. 356-364 (1996).
Suryani, "Bus Voltage Level Comparisons for Distributed Power Architectures," Power Conversion & Intelligent Motion, pp. 10-18 (1995).
Suryani, "The Value of Distributed Power," Proceedings of 1995 IEEE Applied Power Electronics Conference and Exposition—APEC'95, pp. 104-110 (1995).
SynQor, "16A Non-Isolated DC/DC Converter in SMT package," SynQor Inc. Technical Specification, Product# NQ12xxxSMA16, 16 pages (2004).
SynQor, "16A Non-Isolated, SMT DC/DC Converter with Wide Trim," SynQor Inc. Technical Specification, Product #NQ12T5OSMA16, 15 pages (2004).
SynQor, "16Amp, Wide Output Range, Non-Isolated DC/DC Converter," SynQor Inc. Technical Specification, Product # 1Q04T33VMA16, 20 pages (2004).
SynQor, "BusQor Bus Converter BQ50120QTA20," SynQor Inc. Technical Specification, 12 pages (2006).
SynQor, "IBA vs. DPA: What to Consider When Choosing an On-Board Power Architecture," A Technical White Paper by SynQor Inc., 4 pages (n.d.).
SynQor, "SynQor—Advancing the Power Curve," SynQor Inc., 24 pages (2003).
SynQor, "SynQor High Efficiency DC/DC Converters," SynQor Inc., 24 pages (2003).
SynQor, "SynQor Introduces 1.2V output Module for60A series of Half-Brick DC/DC Converters," SynQor, Inc. Press Release, 1 page (2002).
SynQor, "SynQor Introduces Wide-Input, Point-of-Load DC/DC Converters," SynQor, Inc. Press Release, 1 page (2004).
SynQor, "SynQor's Bus Converter Delivers 240 Watts in Quarter-Brick," SynQor, Inc. Press Release, 1 page (2002).
SynQor, "The PowerQor Series of DC/DC Converters," SnyQor Inc., 6 pages (n.d.).
SynQor, "BusQor Series," retrieved from http://web.archive.org/web/20020814221649/http://www.synqor.com/products/busqor_qb.html, 2 pages, (2002).

SynQor, "Technology Overview," retrieved from http://web.archive.org/web/20020208055450/http://www.synqor.com/products/2_2_tech_overview.html, 6 pages (2002).
Tabisz, et al., "A MOSFET Resonant Synchronous Rectifier for High-Frequency DC/DC Converters," 21st Annual IEEE Conference on Power Electronics Specialists, pp. 769-779 (1990).
Tabisz, et al., "Present and future of distributed power systems," Proceedings of APEC '92 Seventh Annual Applied Power Electronics Conference and Exposition, pp. 11-18 (1992).
Takagi, et al., "Ultra High Efficiency of 95% for DC/DC Converter—Considering Theoretical Limitation of Efficiency," Seventeenth Annual IEEE Applied Power Electronics Conference and Exposition, pp. 735-741 (2002).
Tam & Yang, "Functional Models for Space Power Electronic Circuits," IEEE Transactions on Aerospace and Electronic Systems 31(1), pp. 288-296 (1995).
Taylor, "Distributed Power Processing: The Systems Solution," INTELEC '83—Fifth International Telecommunications Energy Conference, pp. 310-314 (1983).
TDK Innoveta Inc. & TDK Corporation, "Stability Analysis of Bus Architecture," 2004 IBM Power Technology Symposium, 24 pages (2004).
Tektronix, "AA 501 Distortion Analyzer with Options—Instruction Manual," Tektronix, Inc., 161 pages (1981).
Tektronix, "PS5004 Precision Power Supply—Instruction Manual," Tektronix, Inc., 142 pages (1986).
Tektronix, "TM 5003 Power Module—Instruction Manual," Tektronix, Inc., 73 pages (1981).
Tektronix, "TM 503 Power Module—Instruction Manual," Tektronix, Inc., 59 pages (1984).
Texas Instruments, "TI Unveils Next-Generation Point-of-Load Power Modules with Ultra-Fast Transient Response," retrieved from http://newscenter.ti.com/Blogs/newsroom/archive/2005/11/07/ti-unveils-next-generation-point-of-load-power-modules-with-ultra-fast-transient-response-sc05226.aspx, 2 pages (2005).
Theron, et al., "Soft Switching Self-Oscillating FET-Based DC-DC Converters," PESC '92 Record. 23rd Annual IEEE Power Electronics Specialists Conference, pp. 641-648 (1992).
Thollot, et al., "Power Electronics Technology and Applications 1993," IEEE Technology Update Series, pp. 13-22, 196-203, 207-209, 211-217, 259-302 (1993).
Thorsell, "Mini DC-DC Supplies Simplify Redundancy in Parallel Systems," Academic OneFiley, Gale Document No. A6321372, 4 pages (1988).
Thorsell, "Will Distributed On-Board DC/DC Converters Become Economically Beneficial in Telecom Switching Equipment," 12th International Conference on Telecommunications Energy, pp. 63-69 (1990).
Tokai Corp. v. Eastern Enterprises, Inc., 632 F.3d 1358 (Fed. Cir. 2011), 39 pages.
Traister, "Voltage Regulator Circuit Manual," Academic Press, Inc., 77 pages (1989).
Trial Testimony Transcript of Dec. 14, 2010, AM Session, *SynQor, Inc. v. Artesyn Technologies, et al.*, Case No. 2:07-CV-479, 51 pages.
Tsai & Ng, "A Low-Cost, Low-Loss Active Voltage-Clamp Circuit for Interleaved Single-Ended Forward PWM Converter," Proceedings of the Eighth Annual Applied Power Electronics Conference and Exposition, pp. 729-733 (1993).
Uceda & Cobos, "Supplying Power at Low Voltage (3.3V)," Proceedings of First International Caracas Conference on Devices, Circuits and Systems, pp. 244-251 (1995).
Unitrode, "Switching Regulated Power Supply Design Seminar," Unitrode Corporation, 134 pages (1993).
Unknown, "Chapter II: Inverters and Converters," and "Chapter III, Regulated Power Supplies," pp. 2-1-2-65 and 3-1-3-31, (n.d.).
Vazquez, et al., "A Systematic Approach to Select Distributed, Centralised or Mixed Power Architecture in Telecom Applications," INTELEC—Twentieth International Telecommunications Energy Conference, pp. 129-136 (1998).

(56) References Cited

OTHER PUBLICATIONS

Vazquez, et al., "Fixed Frequency Forward-Flyback Converter with Two Fully Regulated Outputs," Proceedings of INTELEC 95—17th International Telecommunications Energy Conference, pp. 161-166 (1995).
Vicor Powerblog, "Background to Factorized Power Architecture," Vicor Corporation, retrieved from http://powerblog.vicorpower.com/2011/11/background-to-factorized-power-architecture, 4 pages (2016).
Vicor Powerblog, "Build Small, Lighter Power Systems by Eliminating Bulk Capacitance," Vicor Corporation, retrieved from http://powerblog.vicorpower.com/2015/10/build-small-lighter-power-systems-eliminating-bulk-capacitance/, 3 pages (2015).
Vinciarelli, "Factorized Power Architecture & VI Chips—Power Paradigm of the Future?" Vicor Corporation Webcast, partial transcript, retrieved from http://cdn.vicorpower.com/documents/webcasts/fp_webcast.swf on May 23, 2016, 2 pages.
Vithanage, et al., "150W Board Mounted Power Supply Module Using Highly Compact and Efficient Synchronous Rectifiers," APEC '98 Thirteenth Annual Applied Power Electronics Conference and Exposition, pp. 177-183 .(1998).
Vlatkovic, et al., "Small-Signal Analysis of the Phase-Shifted PWM Converter," IEEE Transactions on Power Electronics 7(1), pp. 128-135 (1992).
Watson, "New Techniques in the Design of Distributed Power Systems," Virginia Polytechnic Institute and State University Thesis, 12 pages (1998).
Weinberg & Ghislanzoni, "A New Zero Voltage and Zero Current Power-Switching Technique," IEEE Transactions on Power Electronics 7(4), pp. 655-665 (1992).
Weinberg, "A Novel Lossless Resonant MOSFET Driver," PESC '92 Record. 23rd Annual IEEE Power Electronics Specialists Conference, pp. 1003-1010 (1992).
White & Miles, "Principles of Fault Tolerance," Proceedings of Applied Power Electronics Conference—APEC '96, pp. 18-25 (1996).
White, "Emerging on-board power architectures," Eighteenth Annual IEEE Applied Power Electronics Conference and Exposition, pp. 799-804 (2003).
Wiegman, "A Resonant Pulse Gate Drive For High Frequency Applications," Proceedings of APEC '92 Seventh Annual Applied Power Electronics Conference and Exposition, pp. 738-743 (1992).
Wiegman, et al., "A Dual Active Bridge SMPS Using Synchronous Rectifiers," High Frequency Power Conversion Conference Proceedings, pp. 336-346 (1990).
Wildrick, "Stability of Distributed Power Supply Systems," Virginia Polytechnic Institute and State University Thesis, 97 pages (1993).
Wildrick, et al., "A Method of Defining the Load Impedance Specification for a Stable Distributed Power System," IEEE Transactions on Power Electronics 10(3), pp. 280-285 (1995).
Xi, et al., "A Precisely Regulated Multiple Output Forward Converter Topology," Fifteenth Annual IEEE Applied Power Electronics Conference and Exposition, pp. 986-992 (2000).
Xi, et al., "A Zero Voltage Switching and Self-Reset Forward Converter Topology," APEC '99—Fourteenth Annual Applied Power Electronics Conference and Exposition, pp. 827-833 (1999).
Xi, et al., "An Improved Technique for the Synchronous Rectifier Mosfets in the Forward Converter Topology," CCECE '97—Canadian Conference on Electrical and Computer Engineering. Engineering Innovation: Voyage of Discovery, pp. (1997).
Xi, et al., "The Point of Use DC/DC Power Distribution: The Architecture and an Implementation," INTELEC. Twenty-Second International Telecommunications Energy Conference, pp. 498-505 (2000).
Xiao & Oruganti, "Soft Switched PWM DC/DC Converter With Synchronous Rectifiers," Proceedings of Intelec'96—International Telecommunications Energy Conference, pp. 476-484 (1996).
Xuefei, et al., "Studies of Self-Driven Synchronous Rectification in Low Voltage Power Conversion," Proceedings of the IEEE 1999 International Conference on Power Electronics and Drive Systems, pp. 212-217 (1999).
Yang, et al., "A New Dual Channel Resonant Gate Drive Circuit For Synchronous Rectifiers," Twenty-First Annual IEEE Applied Power Electronics Conference and Exposition, pp. 756-762 (2006).
Yang, et al., "Isolated Boost Circuit for Power Factor Correction," The VPEC Annual Power Electronics Seminar, pp. 97-104 (1992).
Yee, et al., "A Self-Driven Synchronous Rectifier," Proceedings of 1994 Power Electronics Specialist Conference—PESC'94, pp. 627-633 (1994).
Yeung, et al., "Generalised analysis of switched-capacitor step-down quasi-resonant converter," Electronics Letters 38(6), pp. 263-264 (2002).
Yeung, et al., "Zero-current switching switched-capacitor quasiresonant step-down converter," IEE Proceedings—Electric Power Applications 149(2), pp. 111-121 (2002).
Yoshida, et al., "A Novel Zero Voltage Switching Half Bridge Converter," Proceedings of Intelec 94, pp. 566-572 (1994).
Yoshida, et al., "Zero Voltage Switching Approach For Flyback Converter," Proceedings of the Fourteenth International Telecommunications Energy Conference—INTELEC '92, pp. 324-329 (1992).
Zhang, et al., "Analysis and Evaluation of Interleaving Techniques in Forward Converters," IEEE Transactions on Power Electronics 13(4), pp. 690-698 (1998).
Zhang, et al., "Commutation Analysis of Self-Driven Synchronous Rectifiers in an Active-Clamp Forward Converter," 27th Annual IEEE Power Electronics Specialists Conference, pp. 868-873 (1996).
Zhang, et al., "Design Considerations and Performance Evaluations of Synchronous Rectification in Flyback Converters," Proceedings of APEC 97—Applied Power Electronics Conference, pp. 623-630 (1997).
Zhang, et al., "Design considerations for low-voltage on-board DC/DC modules for next generations of data processing circuits," IEEE Transactions on Power Electronics 11(2), pp. 328-337 (1996).
Zhou, et al., "A Novel High-input-voltage, High Efficiency and Fast Transient Voltage Regulator Module—Push-pull Forward Converter," APEC '99—Fourteenth Annual Applied Power Electronics Conference and Exposition, pp. 279-283 (1999).
Zhou, et al., "Investigation of Candidate VRM Topologies for Future Microprocessors," Thirteenth Annual Applied Power Electronics Conference and Exposition, pp. 145-150 (1988).
Zhao, et al., "Analysis of High Efficiency DC/DC Converter Processing Partial Input/Output Power," Department of Electrical and Computer Engineering University of Wisconsin-Madison Madison, Wisconsin, U.S.A., 2013.

\* cited by examiner

POWER DISTRIBUTION ARCHITECTURE WITH SERIES-CONNECTED BUS CONVERTER

CROSS-REFERENCE TO RELATED PATENT APPLICATIONS

This application is a Continuation of U.S. application Ser. No. 16/781,070, filed Feb. 4, 2020, which is a Continuation of U.S. application Ser. No. 16/022,636, filed Jun. 28, 2018, which is a Continuation of U.S. application Ser. No. 13/933,252, filed Jul. 2, 2013, each of which are incorporated herein by reference in their entirety.

BACKGROUND

Referring to FIG. 1, a prior art power distribution system 1 such as an Intermediate Bus Architecture ("IBA") is shown having a DC power source 5, supplying power at a source voltage, $V_S$, to the input of a bus converter 10. The output of the bus converter 10 supplies power to one or more down-stream regulators, e.g. regulators 6, 7 which in turn provide regulated power, e.g. regulated voltage, to respective loads 8, 9. The bus converter 10 may include a DC Transformer which is a switching power converter that may provide voltage transformation from its input to output at an essentially fixed voltage gain and also provide galvanic isolation between its input and output. The bus converter 10 may adjust its output slightly during predetermined operating conditions to provide in-rush current limiting, e.g. during start up and may provide partial regulation over selected portions of the source voltage range. Although a single bus converter is shown in FIG. 1, a plurality of bus converters may be connected to receive power from a single source 5 and provide power at one or more voltages to a plurality of down-stream regulators, such as regulators 6 and 7. Additionally, two or more bus converters or two or more DC Transformers may be connected in parallel to increase power throughput or to provide a measure of fault tolerance.

SUMMARY

One embodiment of the disclosure relates to an apparatus that includes a power distribution system comprising a source for providing power at a DC source voltage $V_S$. The apparatus further includes a bus converter that includes an input circuit and an output circuit. The bus converter is adapted to convert power from the input circuit to the output circuit at a substantially fixed voltage transformation ratio $K_{DC}$ at an output current. An input voltage $V_{IN}$ is applied to the input circuit and an output voltage $V_{OUT}$ is produced by the output of the bus converter, and the substantially fixed voltage transformation ratio can be represented as $K_{DC}=V_{OUT}/V_{IN}$. The apparatus further includes a power distribution bus connected to distribute power from the output circuit of the bus converter at the output voltage $V_{OUT}$. The apparatus further includes a plurality of regulators. Each regulator includes a regulator input connected to the power distribution bus to receive power from the output circuit of the bus converter and a regulator output connected to supply power to a respective load. The plurality of regulators each are separated by a distance from the bus converter. The input circuit of the bus converter and at least a portion of the output circuit of the bus converter are connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

Another embodiment relates to an apparatus that includes a power converter including an input circuit and an output circuit. The power converter is configured to receive power from a power distribution system comprising a source for providing power at a DC source voltage $V_S$. The power converter is adapted to convert power from the input circuit to the output circuit at a substantially fixed voltage transformation ratio $K_{DC}$ at an output current. An input voltage $V_{IN}$ is applied to the input circuit and an output voltage $V_{OUT}$ is produced by the output of the power converter. The substantially fixed voltage transformation ratio can be represented as $K_{DC}=V_{OUT}/V_{IN}$. The power converter further includes a series connection between the input circuit of the power converter and at least a portion of the output circuit of the power converter across the source, such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

Yet another embodiment relates to an apparatus that includes a bus converter including an input circuit and an output circuit. The bus converter is configured to receive power from a power distribution system including a source for providing power at a DC source voltage $V_S$. The bus converter is adapted to convert power from the input circuit to the output circuit at a substantially fixed voltage transformation ratio $K_{DC}$ at an output current. An input voltage $V_{IN}$ is applied to the input circuit and an output voltage $V_{OUT}$ is produced by the output of the bus converter, and the substantially fixed voltage transformation ratio can be represented as $K_{DC}=V_{OUT}/V_{IN}$. The apparatus further includes a power distribution bus connected to distribute power from the output circuit of the bus converter at the output voltage $V_{OUT}$. The apparatus further includes a plurality of regulators. Each regulator includes a regulator input connected to the power distribution bus to receive power from the output circuit of the bus converter and a regulator output connected to supply power to a respective load. The plurality of regulators each are separated by a distance from the bus converter. The input circuit of the bus converter and at least a portion of the output circuit of the bus converter are connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

Another embodiment relates to an apparatus comprising an intermediate bus architecture power distribution system for a telecommunications system comprising a source for providing power at a DC source voltage; a circuit board comprising a bus converter, the bus converter comprising an input circuit, the input circuit comprising a primary transformer winding, the bus converter further comprising an output circuit, the output circuit comprising a secondary transformer winding, wherein the primary and secondary transformer windings are galvanically connected in series, and wherein the bus converter is configured to provide power to a power distribution bus that is not galvanically isolated from the source; and the circuit board further comprising a plurality of regulators, wherein each regulator comprises a regulator input connected to the power distribution bus to receive power from the output circuit of the bus converter and a regulator output connected to supply power to a respective load, the plurality of regulators each being separated by a distance from the bus converter.

DETAILED DESCRIPTION

Power Distribution Architecture

Figure 3:
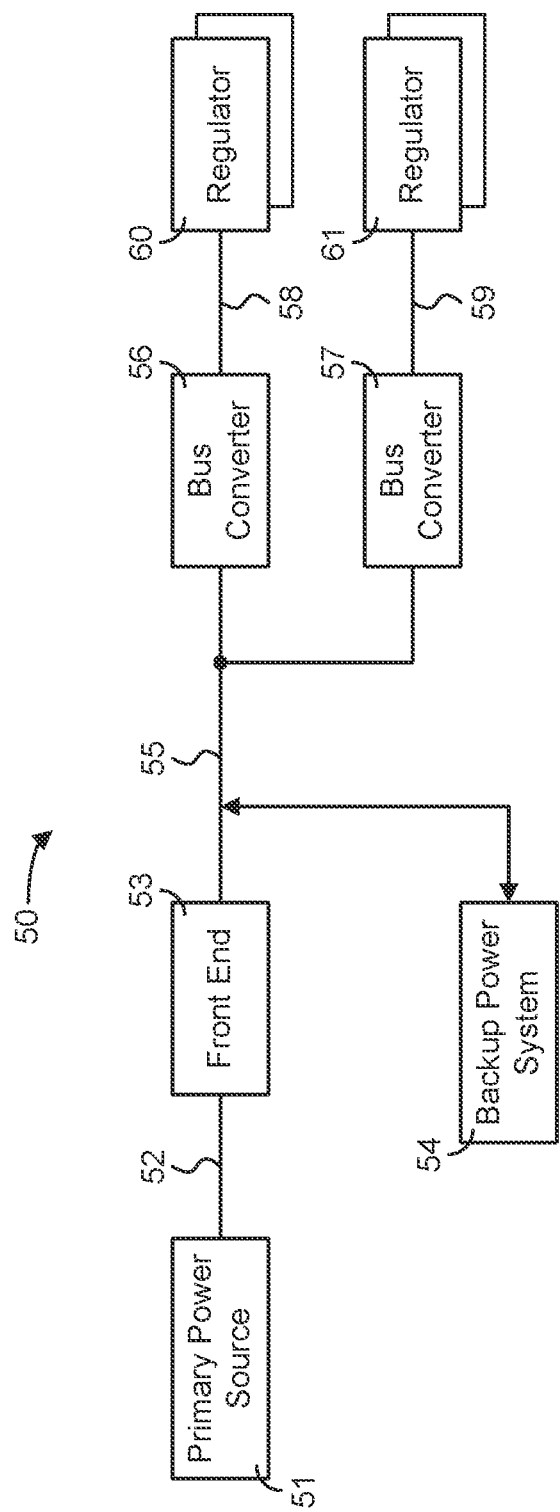
FIG. 3 shows a schematic diagram of a new power distribution architecture according to an illustrative embodiment.

A power distribution system 50 is shown in FIG. 3 having a primary power source 51 delivering power via a connection 52 to a front-end power-processing unit 53. The primary power source 51 may be an AC utility line, and the front end unit 53 may be a power conversion stage that converts power from the power source 51 delivering power at a relatively high but safe DC voltage to a power distribution bus 55, e.g. the DC voltage may vary from a minimum, e.g. 38 Volts, to a maximum, e.g. 55 Volts. Preferably, the front-end unit 53 provides voltage step down and isolation and may optionally provide power factor correction, regulation, or both. An optional backup power system 54 is shown connected to the power distribution bus 55 to provide power in the event of a loss of power from the primary power source 52. The backup power system may include batteries, a charger for maintaining the batteries, and a switchover mechanism that connects the batteries to the bus in response to predetermined events, such as a decline in voltage or loss of power from the output of the front end 53 or the primary power source 51.

One or more bus converters, e.g. bus converters 56, 57, may be connected to the power distribution bus 55 downstream from the front end 53 as shown in the example of FIG. 3 to convert power received from the relatively high voltage power distribution bus 55 for delivery to a respective lower voltage bus. As shown, bus converters 56 and 57 respectively supply power to buses 58 and 59 at voltages, e.g. at or near the requisite load voltages, that are lower than the voltage of the power distribution bus 55, providing step-down voltage transformation. The bus converters 56, 57 are generally separated by a distance from their respective regulators 60, 61. For example, in a typical system, one or more system circuit boards housed in a common enclosure may each include one or more bus converters, preferably located near the edge of, or other location on, the board where power connections are made to the board. A down-stream regulator receiving power from the bus converter(s) may be preferably located adjacent to the circuitry, e.g. a processor, ASIC, or other circuitry, to which it or they supply power. The physical distance separating the bus converter and a respective down-stream regulator in such an example may range from as much as a dimension of the system circuit board, i.e. a diagonal dimension where the bus converter and regulator located at opposite corners, a length or width dimension where they are located at opposite edges, a half-length or width where one is situated closer to the middle and the other is at an edge, etc. In another example, a bus converter may be located off of the system board in which case the electrical distance could be greater than a dimension of the system board. Naturally, the distance separating the bus converter and a respective down-stream regulator will depend on the system layout. However, a bus converter housed in a self-contained assembly adapted to be installed as a unit at a location remote from the down-stream regulator(s) may be separated by a distance from a down-stream regulator regardless of their respective mounting locations at the system level.

The output of each bus converter 56, 57 may, in turn, provide power via its respective bus 58, 59 to a respective plurality of regulators, preferably at or near the point of load, such as point-of-load switching voltage regulators 60, 61. It should be understood that although two bus converters 56, 57 are shown in the example of FIG. 3, any number of bus converters, e.g. one, may be used. Similarly, although regulators 60 and 61 are shown in FIG. 3 as comprising a plurality of individual regulators, any suitable number of regulators, e.g. one, may be connected to a particular bus converter within the constraints of the physical devices used. The regulators 60, 61 may supply power to respective loads (not shown). The loads can be a variety of devices, including integrated circuits and electromechanical devices (such as storage and cooling devices).

The bus converters 56, 57 shown in the system of FIG. 3, however, preferably do not provide galvanic isolation between their respective output busses 58, 59 and the power distribution bus 55 as described in additional detail below.

Series-Connected DC Transformer

Figure 1:
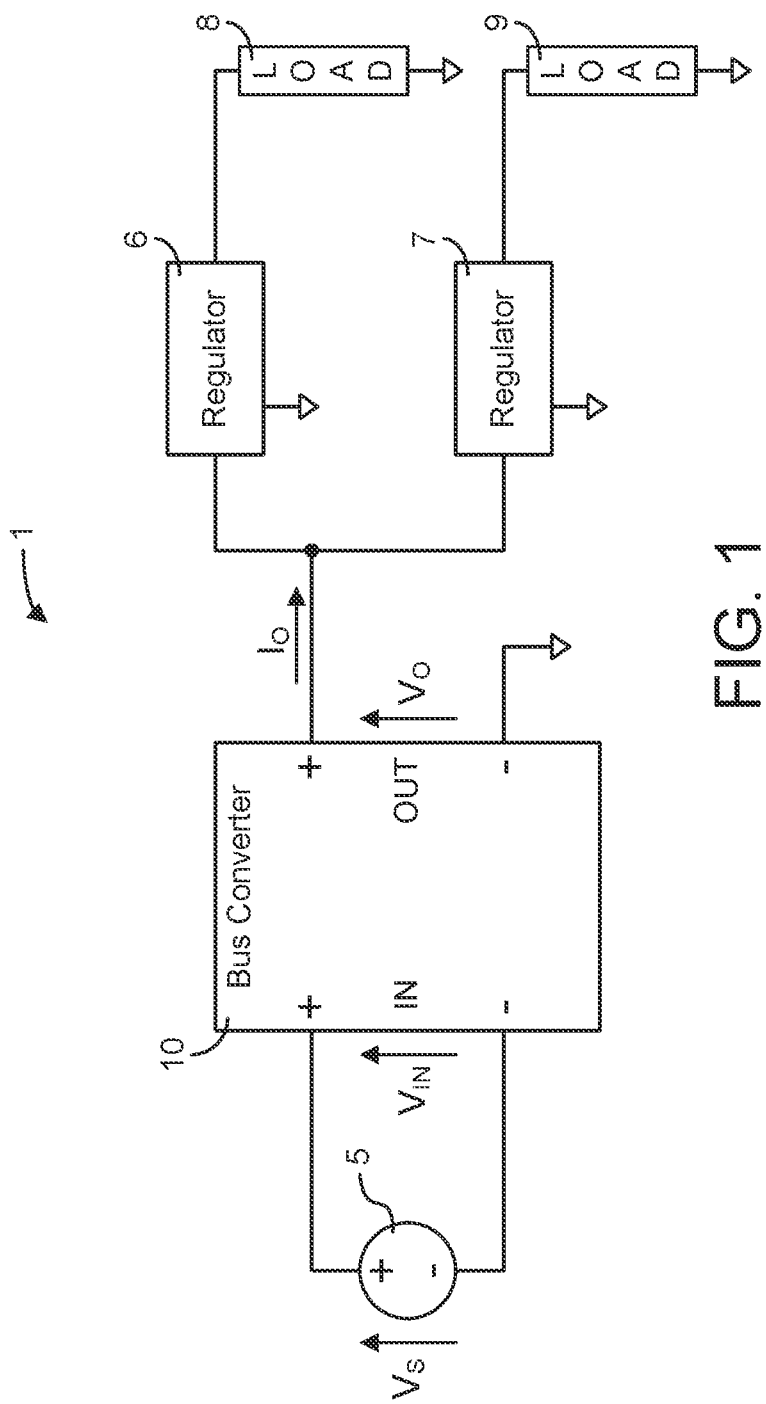
FIG. 1 shows a schematic block diagram of a prior art IBA power distribution system according to an illustrative embodiment.
Figure 2:
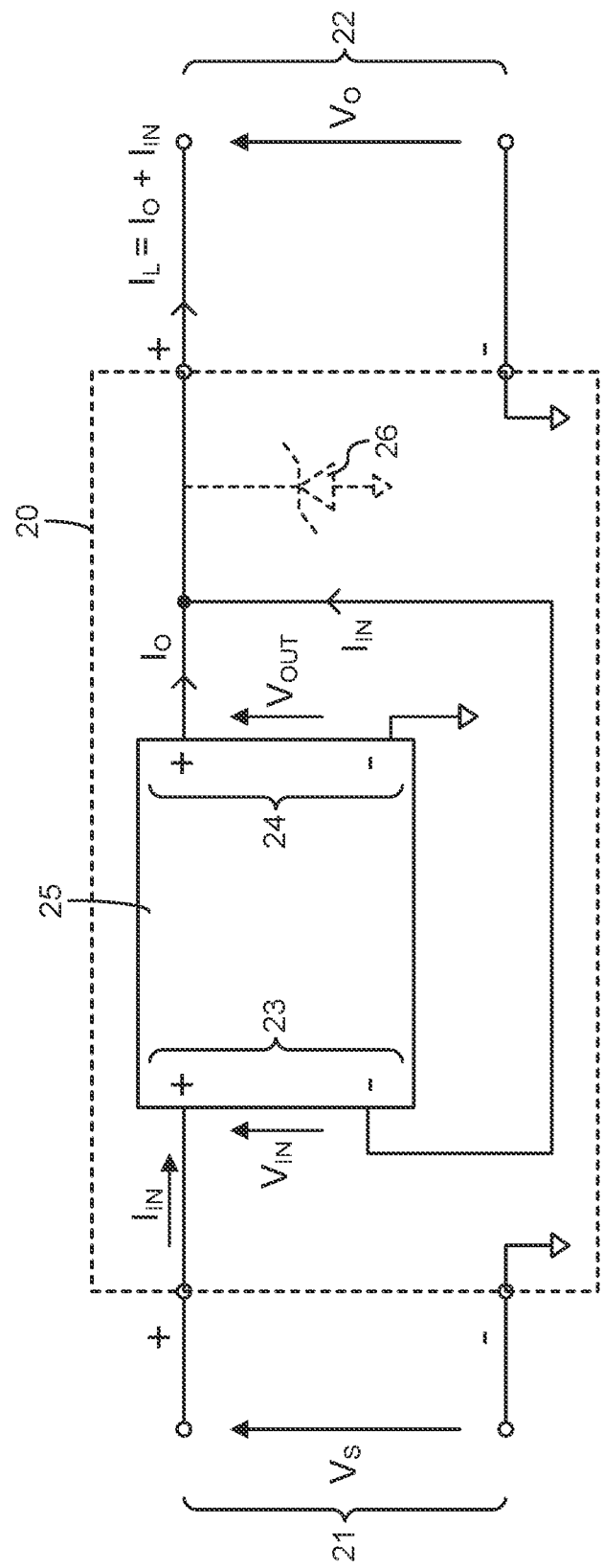
FIG. 2 shows a functional block diagram of a series-connected DC Transformer according to an illustrative embodiment.

Referring to FIG. 2, a functional block diagram of a series-connected power conversion system 20 suitable for use as a bus converter in the power distribution system 50 of FIG. 3 is shown. The power conversion system 20 includes an input 21 for receiving power from a source at a source voltage, $V_S$, and an output 22 for delivering power to a load at an output voltage, $V_O$, that is less than $V_S$, and a DC Transformer 25. The DC Transformer 25 may be implemented preferably using the Sine-Amplitude Converter ("SAC") topologies and timing architectures described in Vinciarelli, Factorized Power Architecture and Point of Load Sine Amplitude Converters, U.S. Pat. No. 6,930,893 and in Vinciarelli, Point of Load Sine Amplitude Converters and Methods, U.S. Pat. No. 7,145,786 both assigned to VLT., Inc. and incorporated here in their entirety by reference (hereinafter the "SAC Patents"). Alternatively, other converter topologies, such as hard-switching, fixed ratio DC-DC converters, may be used. The DC Transformer 25 converts power received from its input 23 (distinguished from the input 21 of the bus converter 20) at an input voltage, $V_{IN}$, for delivery to its output 24 at an output voltage, $V_{OUT}$, using an essentially fixed voltage gain or voltage transformation ratio.

The voltage gain or voltage transformation ratio of a system as defined generally herein is the ratio of its output voltage to its input voltage at a specified current such as an output current. For the system 20 in FIG. 2, the voltage transformation ratio may be expressed as $K_{SYS}=V_O/V_S$ @ $I_L$. Similarly, the voltage transformation ratio of the DC Transformer 25 may be stated as $K_{DC}=V_{OUT}/V_{IN}$ @ $I_O$. Note that the system output voltage, $V_O$, and the DC Transformer output voltage, $V_{OUT}$, are the same in the configuration shown. However, the input 23 and output 24 of the DC Transformer 25 are shown in a series-connected configuration across the system input 21. As a result, the input voltage, $V_{IN}$, to the DC Transformer input 23 is less than the input voltage, $V_S$, to the system input 21 by an amount equal to the output voltage:

$$V_{IN}=V_S-V_O. \quad (1)$$

Similarly as shown in FIG. 2, the current, $I_L$, drawn by the load from the system output 22 is greater than the current produced at the output 24 of the DC Transformer 25 by an amount equal to the input current:

$$I_O=I_L-I_{IN}. \quad (2)$$

The system voltage transformation ratio, $K_{SYS}$, using the series-connected DC Transformer 25, may be expressed as a function of the DC Transformer voltage transformation ratio, $K_{DC}$:

$$K_{SYS}=K_{DC}/(K_{DC}+1) \quad (3)$$

The above equation (3) may be rearranged to express the DC Transformer 25 voltage transformation ratio, $K_{DC}$, required in a series-connected system as a function of the system voltage transformation ratio, $K_{SYS}$:

$$K_{DC}=K_{SYS}/(1-K_{SYS}) \quad (4)$$

Figure 4:
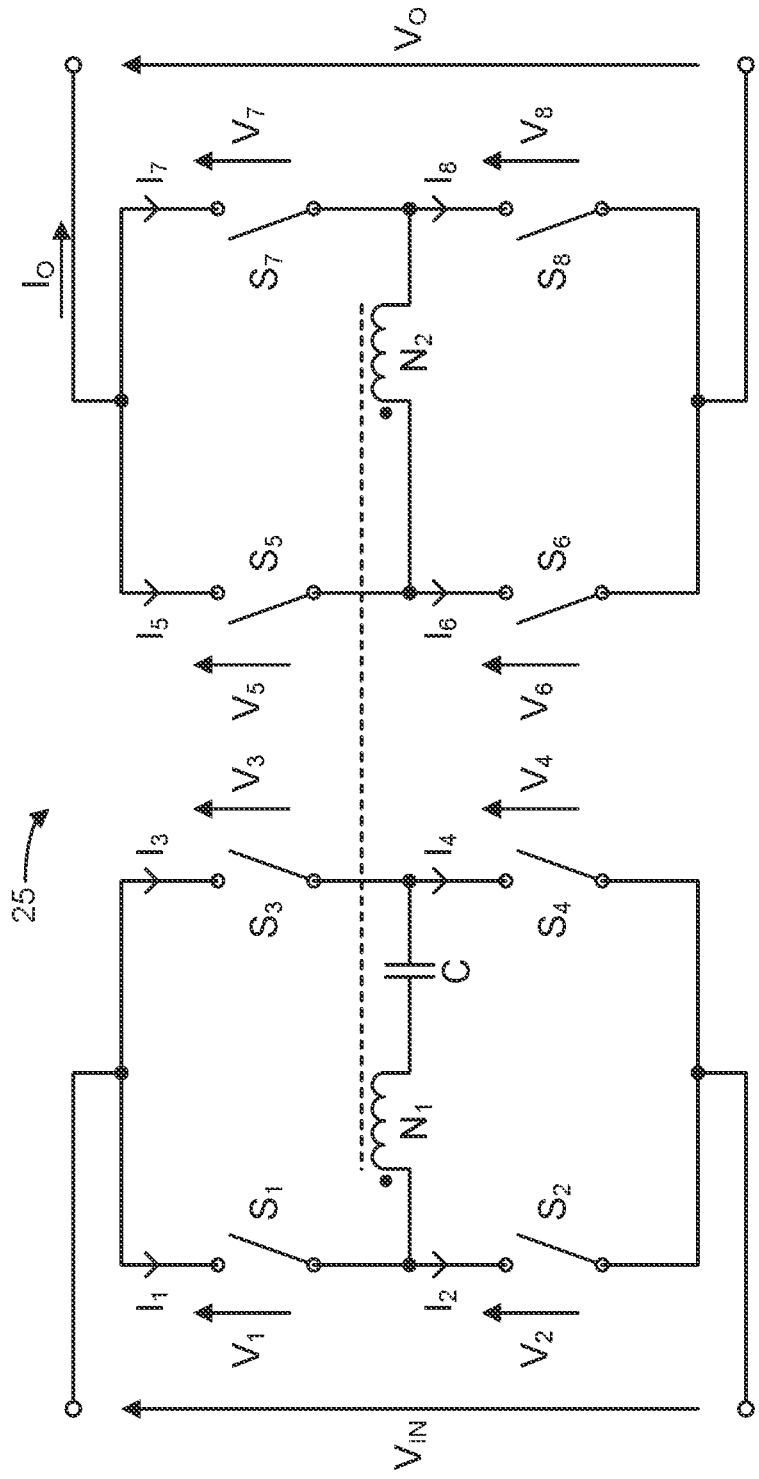
FIG. 4 shows a schematic diagram of an isolated SAC-based DC Transformer according to an illustrative embodiment.

Referring to FIG. 4, an isolated SAC that may be utilized for DC Transformer 25, according to one embodiment, is shown having a full-bridge input circuit, including switches S1, S2, S3, and S4, connected to drive the resonant circuit including capacitor C and the input winding, having N1 turns, with the input voltage $V_{IN}$. The isolated SAC is shown having a full-bridge output circuit, including switches S5, S6, S7, and S8, connected to rectify the voltage impressed across the output winding, having N2 turns, and delivering the output voltage, $V_O$. The voltage transformation ratio of the SAC will be essentially a function of the turns ratio: $K_{DC}==V_O/V_{IN}=N2/N1$.

Figure 5:
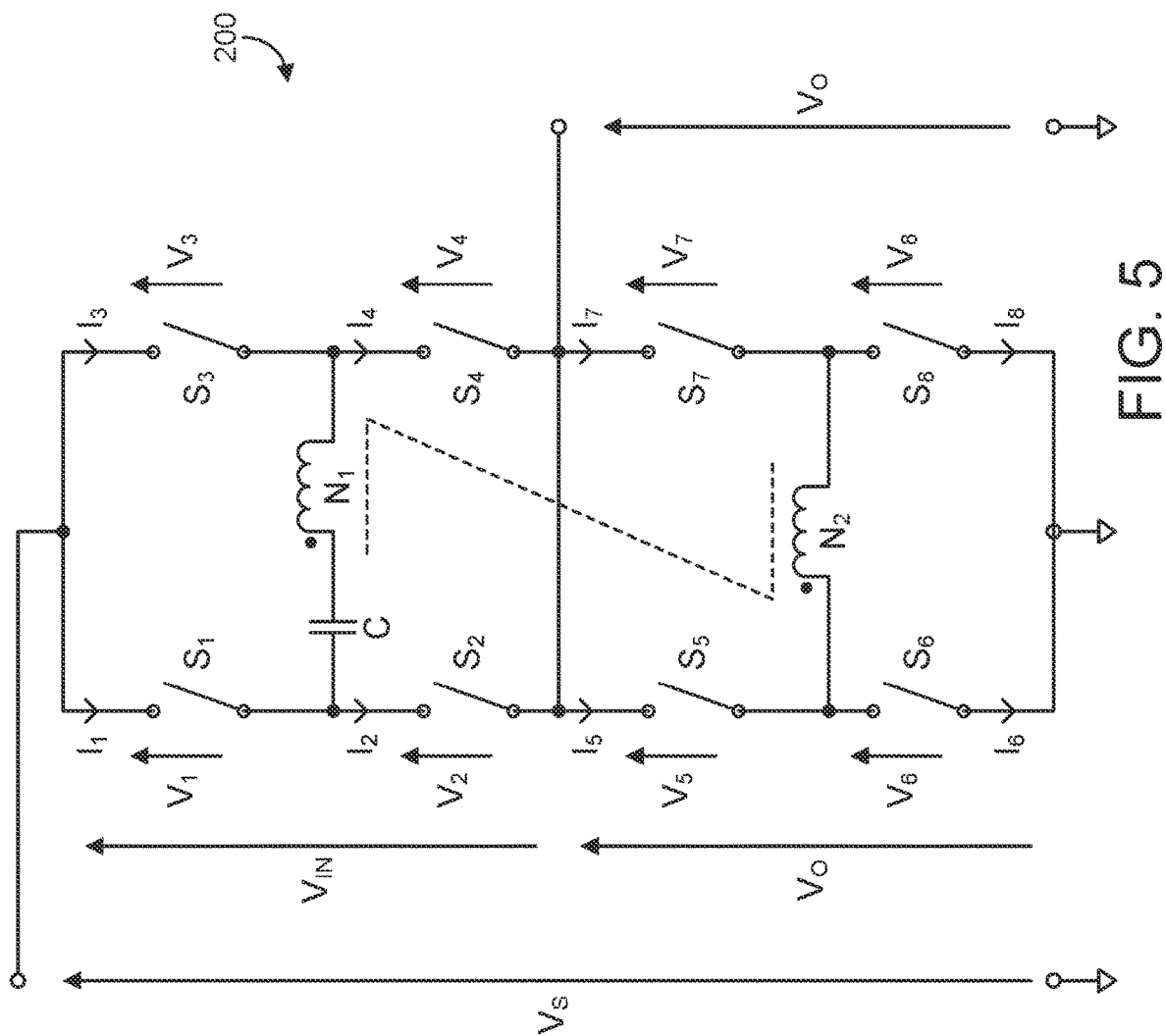
FIG. 5 shows a schematic diagram of a series-connected SAC-based DC Transformer according to an illustrative embodiment.

A series-connected SAC 200 is shown in FIG. 5. By way of comparison, the series-connected SAC 200 uses the same full-bridge input circuit topology, including switches S1, S2, S3, and S4, driving the resonant circuit including capacitor C and the input winding, having N1 turns, with the input voltage $V_{IN}$. SAC 200 also uses the same full-bridge output topology, including switches S5, S6, S7, and S8, connected to rectify the voltage impressed across the output winding, having N2 turns, and delivering the output voltage, $V_O$. The voltage transformation ratio of the series-connected SAC 200 from the input circuit to output circuit is also essentially a function of the transformer turns ratio N2/N1 and the same as the isolated SAC 25 in FIG. 4: $K_{DC}=V_O/V_{IN}=N2/N1$. However, when evaluated in terms of the system, i.e. using $V_S$ applied across the series-connected input and output, the voltage transformation ratio becomes: $K_{SYS}=V_O/V_S=N2/(N2+N1)$.

Many contemporary applications use a voltage transformation ratio equal to ⅕ requiring an odd transformer turns ratio (N2/N1=⅕) which is generally not optimal. Referring to equation (4) above, the $K_{SYS}$=⅕ bus converter may be implemented using a $K_{DC}$=¼ series-connected topology (e.g. as shown in FIGS. 2, 4, and 5), allowing the use of an even, i.e. 1:4, turns ratio in the transformer. An even transformer turns ratio may provide greater transformer layout flexibility and efficiency.

Figure 6:
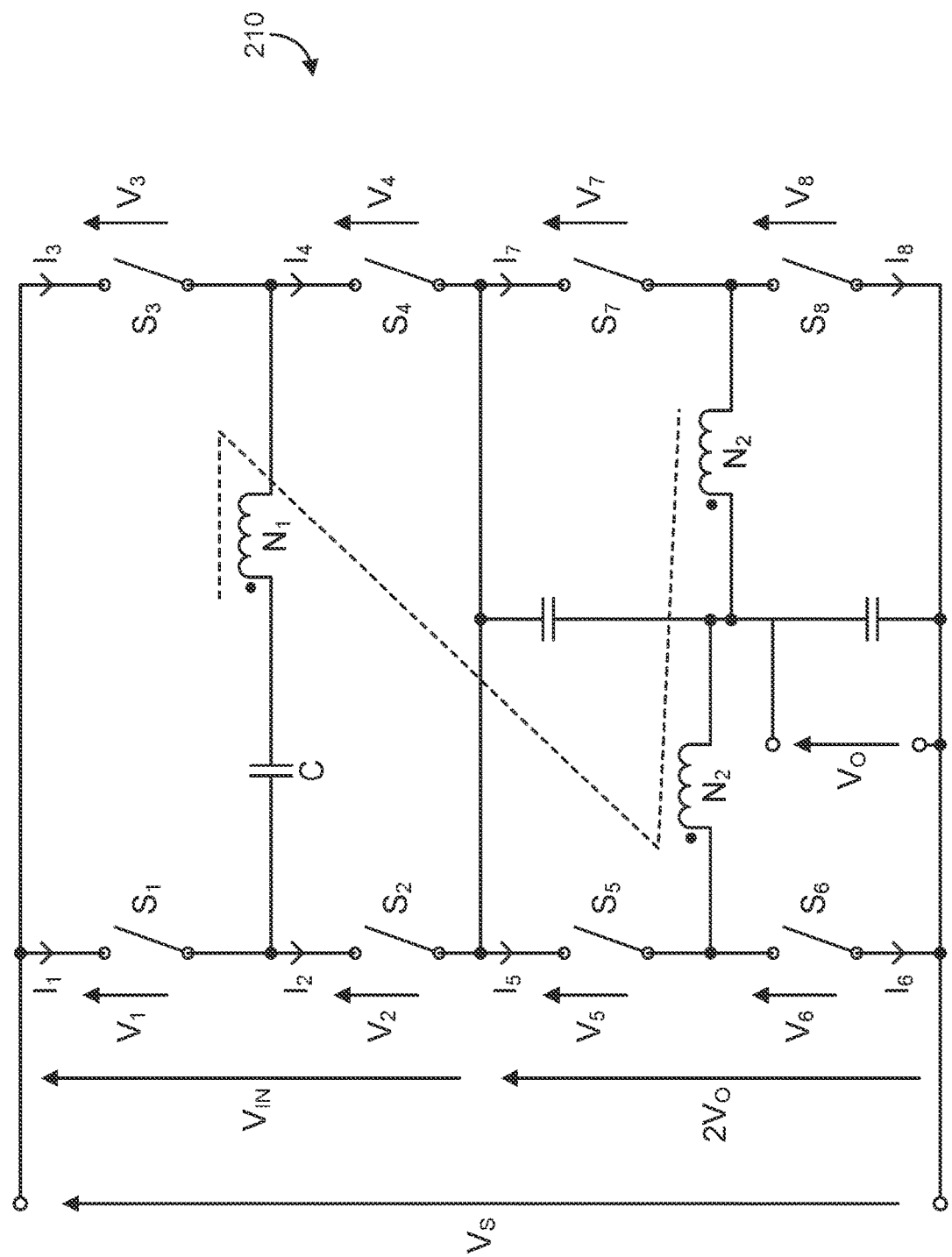
FIG. 6 shows a schematic diagram of a series-connected SAC-based DC Transformer having a center-tapped winding in the output circuit according to an illustrative embodiment.
Figure 7:
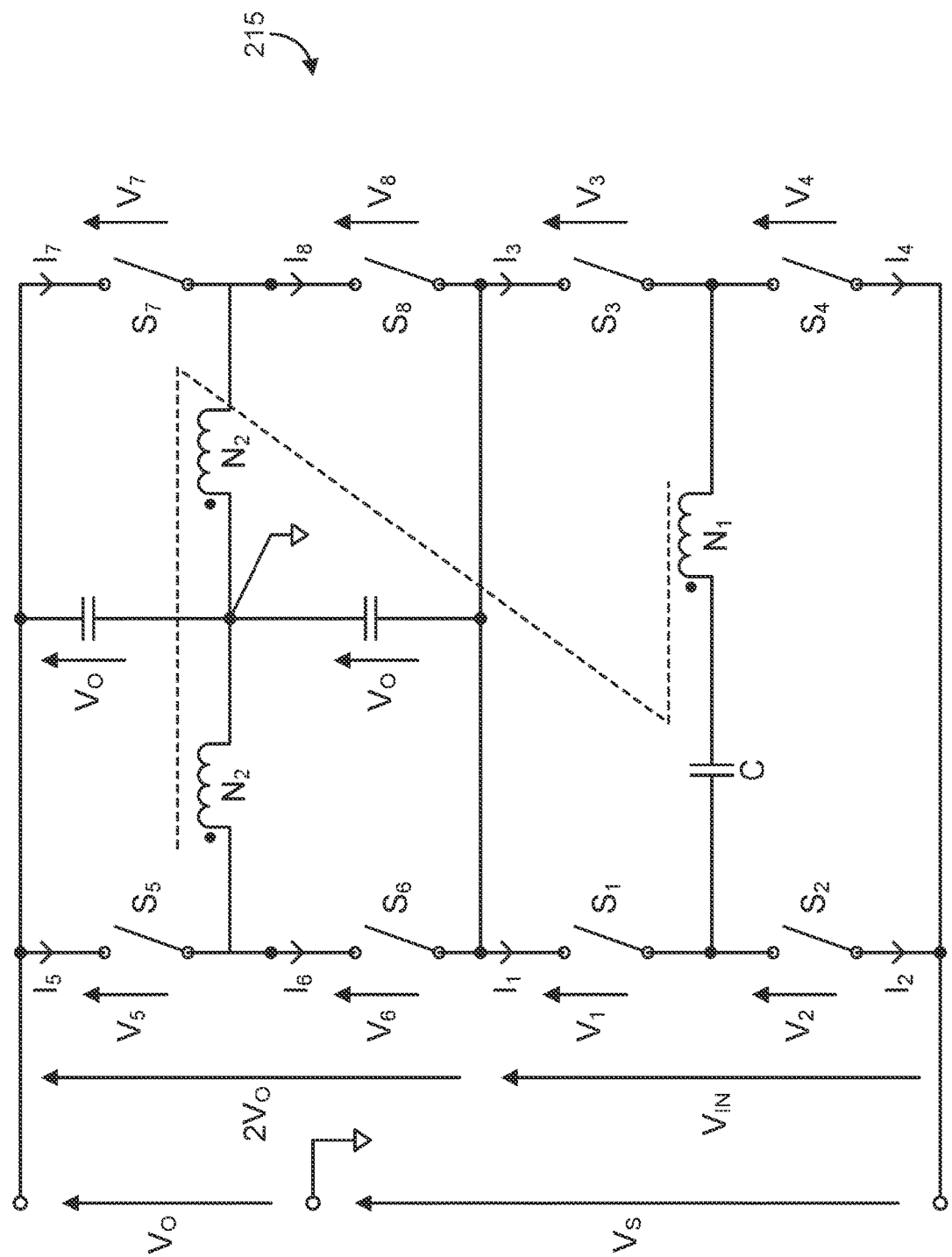
FIG. 7 shows a schematic diagram of a series-connected DC Transformer for receiving power from a negative input source and delivering power at a positive output voltage according to an illustrative embodiment.

Note that the series-connected converter 200 may be implemented by connecting an off-the-shelf isolated DC Transformer, such as the isolated converter shown in FIG. 4, as shown in FIG. 2. Alternatively, the converter 200 may be implemented as series-connected input and output circuits, e.g. as shown in FIGS. 5, 6, and 7 discussed below, in an integrated converter, optionally providing greater power density eliminating the isolation imposed design constraints, eliminating control circuit bias currents from flowing through to the output and the potential need for an output clamp, and providing system-ground referenced control circuitry (not shown) for interface signals that are referenced to ground rather than the output for the reconfigured off-the-shelf isolated converter.

Connecting the input and output of the DC Transformer 25 in series eliminates galvanic isolation between the input and output of the series-connected bus converter 20, which is counterintuitive. However, when used in the architecture of FIG. 3, isolation is deployed at an intermediate stage where the isolation may be superfluous. The architecture of FIG. 3, therefore, trades isolation at this stage for efficiency gain and reduced component stress. If isolation is required, e.g. for safety reasons, in the architecture of FIG. 3, it may preferably be provided by an upstream power conversion stage such as the front-end converter 53.

Efficiency

The power processed by the isolated SAC shown in FIG. 4 may be compared with that of the series-connected SAC 200 (FIG. 5) by summing the product of maximum voltage across ($V_n$) and average current ($I_n$) through each switch (n=1 through 8).

$$P_{Processed}=\sum_{n=1}^{n=8n}(Vn*In) \quad (5)$$

Each input switch (S1, S2, S3 and S4) in the full bridge input circuits (FIGS. 4, 5) is subjected to the input voltage, $V_{IN}$, (distinguished from the source voltage $V_S$) and an average of one half of the input current, $I_{IN}$. The sinusoidal nature of the current in the SAC topology represents a difference between the RMS and average currents, which is unimportant for the following comparison between two converters using the same topology. The power processed by the input circuits is:

$$P_{IN}=2*V_{IN}*I_{IN} \quad (6)$$

Similarly, each output switch (S5, S6, S7 and S8) in the full bridge output circuit of FIG. 4 will be subjected to the full output voltage, $V_O$, and will carry an average of one half of the output current, $I_O$. Note that the output current in the case of the isolated converter is equal to the load current, $I_L$, and in the case of the series-connected converter (discussed below) is not. The power processed by the output circuits may therefore be reduced to:

$$P_{OUT}=2*V_O*I_O \quad (7)$$

Combining equations (6) and (7) and making the appropriate substitutions using $K_{DC}=V_O/V_{IN}$ and the corollary $I_{IN}=K_{DC}*I_O$, the total power processed by the converters reduces to:

$$P=4*V_O*I_O \quad (8)$$

In the isolated converter of FIG. 4, the output current equals the load current ($I_O=I_L$), therefore, the power processed by the isolated converter, $P_{ISO}$, may be reduced to the following function of load power, $P_{Load}=V_O*I_L$:

$$P_{ISO}=4*P_{Load} \quad (9)$$

Neglecting fixed losses in the converter, the input current may be expressed as a function of the output current and voltage transformation ratio as follows:

$$I_{IN}=I_O*K_{DC} \quad (10)$$

Combining equations (2), (4), and (10), the output current of the series-connected converter may be expressed as a function of load current and voltage transformation ratio as follows:

$$I_{O\text{-}Series}=I_L*(1-K_{SYS}) \quad (11)$$

Substituting equation (11) into equation (8) produces the total power processed by the series-connected converter as a function of load power ($P_{Load}=V_O*I_L$) and system voltage transformation ratio:

$$P_{SERIES}=4*P_{Load}*(1-K_{SYS}) \quad (12)$$

Accordingly, the efficiency advantage of the series-connected converter over the isolated converter—the ratio of equations (12) and (9)—reduces to:

$$P_{SERIES}/P_{ISO}=(1-K_{SYS}) \quad (13)$$

From equation (13) it can be seen that the series-connected converter offers a significant efficiency advantage. Consider a typical example for comparison, using a bus converter to convert power from a nominal 50 Volt power distribution bus for delivery to a 10 volt load ($K_{SYS}=\frac{1}{5}$) at 100 amps: the series-connected converter processes only 80% of the power, offering a 20% efficiency savings compared to the isolated converter.

In a typical isolated DC Transformer, like most DC-DC converters, the control circuitry is configured to operate from power drawn from the input producing a quiescent component of the input current. Use of such a converter, e.g. an off-the-shelf DC Transformer, in a series-connected configuration could, therefore, allow the quiescent input current to flow unregulated into a load connected to the output, which would be problematic while the power train is not operating and, therefore, incapable of regulating the output voltage. It may, for that reason, be desirable to clamp the output voltage using a zener diode, such as zener diode 26 in FIG. 2, or other clamp circuit or device appropriately scaled in breakdown voltage and power dissipation to carry the quiescent input current, protecting the load and perhaps the output circuitry of the converter. Integrating the series-connected input and output circuitry into a non-isolated converter topology such as shown in FIGS. 5, 6, and 7 affords the opportunity to configure the control circuitry to draw power from the input to ground preventing that component of the input current from flowing out to the load. Additionally, a DC blocking capacitor may be used in the power train to avoid leakage current from flowing from the input to the output. One or both of the above measures may be used to avoid the need to clamp the output.

Configuring the control circuitry to reference the system ground in the integrated converter (rather than the input return in the off-the-shelf isolated converter) easily allows any interface signals to be ground-referenced (rather than output referenced) which is advantageous from the perspective of the system integrator.

Center-Tap Secondary

Another series-connected SAC 210 is shown in FIG. 6. By way of comparison, the series-connected SAC 210 uses the same full-bridge input circuit topology, including switches S1, S2, S3, and S4, driving the resonant circuit including capacitor C and the input winding, having N1 turns, with the input voltage $V_{IN}$, as shown in FIG. 5. However, a center-tap output winding, having 2*N2 turns, is used in the output circuit, which includes switches S5, S6, S7, and S8, connected to rectify the voltage impressed across the output windings and delivering the output voltage, $V_O$. The system voltage transformation ratio of the series-connected SAC 210 (FIG. 6) is essentially a function of the transformer turns ratio: $K_{SYS}=V_O/V_{SYS}=N2/(N1+2*N2)$; as is the voltage transformation ratio from input circuit to output circuit: $K_{DC}=V_O/V_{IN}=N2/N1$.

The converter 210 of FIG. 6 differs from the series-connected converter 200 (FIG. 5) in that the input voltage, $V_{IN}$, presented to the input circuit is equal to the source voltage, $V_S$, reduced by twice the output voltage, $V_O$:

$$V_{IN\text{-}210}=V_S-2V_O \quad (14)$$

as suggested by the addition of N2 turns in the output winding of the transformer. Also, each output switch (S5, S6, S7 and S8) in the converter 210 is subjected to twice the output voltage, $V_O$, with the upper output switches (S5 and S7) each carrying an average of half of the input current, $I_{IN}$, and the lower output switches (S6 and S8) each carrying an average of half of the difference between the load current, $I_L$, and the input current, $I_{IN}$. Using the same analysis as described above, summing the product of maximum voltage across ($V_n$) and average current ($I_n$) through each switch (N=1 through 8), the total power processed by the converter 210 of FIG. 6 is:

$$P_{210}=2*V_{IN}*I_{IN}2*V_O*I_{IN}+2*V_O*(I_L-I_{IN}) \quad (15)$$

Using the system voltage transformation ratio, $K_{SYS}=V_O/V_S$ in equation (14), the input voltage may be expressed as:

$$V_{IN\text{-}210}=V_O*((1/K_{SYS})-2) \quad (16)$$

Recognizing that in an ideal converter the input power equals the output power $V_S*I_{IN}=V_O*I_L$ the input current may be expressed as:

$$I_{IN}=K_{SYS}*I_L \quad (17)$$

Making the appropriate substitutions into equation (15), the total power processed by series-connected converter 210 (FIG. 6) reduces to:

$$P_{210}=4*V_O*I_L*(1-K_{SYS}) \quad (18)$$

which may be further reduced to express the total power processed by the series-connected converter 210 using a center-tap output winding as shown in FIG. 6 as a function of load power ($P_{Load}=V_O*I_L$) and system voltage transformation ratio:

$$P_{210}=4*P_{Load}*(1-K_{SYS}) \quad (19)$$

Which is the same result obtained in equation (12) above for the series-connected converter 200 in FIG. 5.

There may be certain advantages of one series-connected topology over the other depending upon the application. For example, the transformer in the converter 200 (FIG. 5) has N2 fewer turns than in the transformer of the converter 210 (FIG. 6) offering reduced winding losses. However, the input switches (S1, S2, S3 and S4) in the converter 210 (FIG. 6) are exposed to lower voltages than in the converter 200 (FIG. 5) which may afford lower switch conduction losses. Also, two of the output switches (S5 and S7) in converter 210 (FIG. 6) carry much less current and may be implemented with smaller and more cost effective devices than in converter 200 (FIG. 5).

Negative Input-Positive Output

Referring to FIG. 7, another series-connected SAC-based converter 215 is shown configured to receive a negative source voltage, $V_S$, and deliver a positive output voltage. (The topology shown in FIG. 7 may alternatively be adapted to receive a positive source voltage and deliver a negative output voltage.) Converter 215 may be viewed as a variation of the converter 210 (FIG. 6) in which the input and output circuit positions have been rearranged with the output terminal serving as the common terminal. The converter 215 of FIG. 7 differs from the converter 210 (FIG. 6) in that the absolute value of the input voltage, $V_{IN}$, presented to the input circuit is equal to the absolute value of the source voltage, $V_S$, reduced by the absolute value of the output voltage, $V_O$ (compared to twice the output voltage in FIG. 6) because of the polarity change from input to output:

$$|V_{IN\text{-}215}| = |V_S| - |V_O| \tag{20}$$

as also suggested by the transformer configuration. Also, the upper output switches (S5 and S7) each carry an average of half of the output current, $I_O$, which equals the load current, $I_L$ in FIG. 7, compared to the difference between the load current, $I_L$, and the input current, $I_{IN}$, in FIG. 6. Once again, summing the product of maximum voltage across ($V_n$) and average current ($I_n$) through each switch (N=1 through 8) as described above, the total power processed by the converter 215 of FIG. 7 is:

$$P_{215} = 2 \ast V_{IN} \ast I_{IN} + 2 \ast V_O \ast I_{IN} + 2 \ast V_O \ast I_L \tag{21}$$

which, when reduced using equations (17) and (20), becomes:

$$P_{215} = 4 \ast P_{Load} \tag{22}$$

A comparison of the power processed by the converter 215 (equation (22); FIG. 7) with the power processed by the isolated converter 25 (equation (9); FIG. 4) may indicate no efficiency advantage, however, the input switches (S1, S2, S3 and S4) in the series-connected converter 215 of FIG. 7 are subjected to lower voltages potentially affording use of better figure of merit switches leading to potential efficiency improvements. Furthermore, the absence of isolation-related design constraints in such an integrated converter may be used to increase power density.

The converters 20 (FIG. 2), 200 (FIG. 5), 210 (FIG. 6), and 215 (FIG. 7) are examples of a class of series-connected converters in which at least a portion of the output circuit is connected in series with the input circuit such that the absolute value of the voltage, $V_{IN}$, presented to the input circuit is equal to the absolute value of the source voltage $V_S$, minus N times the absolute value of the output voltage, $V_O$, where the value of N is at least 1:

$$|V_{IN}| = |V_S| - N \ast |V_O| \tag{23}$$

The value of N will vary depending upon the converter topology used, e.g. a center-tap secondary or not, polarity reversing or not, etc. In the examples described above: N=1 for converters 20 (FIG. 2), 200 (FIG. 5), and 215 (FIG. 7) and N=2 for converter 210 (FIG. 6) as shown in equation 14. Although a full bridge switch configuration is preferred for its superior noise performance, half-bridge switch configurations may also be deployed in the input circuitry, the output circuitry, or both.

The disclosure is described above with reference to drawings. These drawings illustrate certain details of specific embodiments that implement the systems, apparatus, and/or methods of the present disclosure. However, describing the disclosure with drawings should not be construed as imposing on the disclosure any limitations that may be present in the drawings. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

It should be noted that although the disclosure provided herein may describe a specific order of method steps, it is understood that the order of these steps may differ from what is described. Also, two or more steps may be performed concurrently or with partial concurrence. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. An apparatus comprising:
a switching power converter including an input circuit and an output circuit, the switching power converter being constructed and arranged to convert power from the input circuit to the output circuit at a substantially fixed ratio, $K_{DC}$, at an output current, wherein an input voltage $V_{IN}$ is applied to the input circuit and an output voltage $V_{OUT}$ is produced by the output circuit of the switching power converter, and wherein the substantially fixed ratio can be represented as $K_{DC} = V_{OUT}/V_{IN}$;
the input circuit and the output circuit being coupled by a transformer, the transformer including at least a first winding and a second winding;
the input circuit including a first primary power switch and the first winding;
the output circuit including at least one secondary power switch and the second winding;
the input circuit and at least a portion of the output circuit of the switching power converter being connected in series across a source such that an absolute value of the input voltage $V_{IN}$ applied to the input circuit is approximately equal to the absolute value of a DC source voltage $V_S$ minus a number N times the absolute value of the output voltage $V_{OUT}$, where N is at least 1;
a series resonant circuit including the first winding and at least one resonant capacitor connected in series with the first winding, the series resonant circuit having a characteristic resonant frequency and a characteristic resonant period, the first primary power switch being connected to drive the series resonant circuit; and
a switch controller adapted to operate the first primary power switch in a series of converter operating cycles, each converter operating cycle characterized by two power transfer intervals of essentially equal duration each interval having a duration less than the characteristic resonant period, during which one or more primary power switches are ON and power is transferred from the input circuit to the output circuit via the transformer.

2. The apparatus of claim 1, wherein the switching power converter is a self-contained assembly adapted to be installed as a unit.

3. The apparatus of claim 1, wherein both the input circuit and the output circuit comprise full-bridge circuits.

4. The apparatus of claim 1, wherein the output circuit includes a plurality of power switches, wherein the plurality of power switches in the output circuit are controlled to turn ON and OFF at times of essentially zero current.

5. The apparatus of claim 1, wherein the output circuit includes a plurality of power switches, wherein the plurality of power switches in the output circuit are controlled to turn ON and OFF at times of essentially zero voltage.

6. The apparatus of claim 1, wherein the input circuit includes a plurality of power switches, wherein the plurality of power switches in the input circuit are controlled to turn ON and OFF at times of essentially zero voltage.

7. The apparatus of claim 1, wherein the power transfer interval is essentially equal to half of the characteristic resonant period.

8. The apparatus of claim 1, wherein the output current is a sinusoidal half wave.

9. The apparatus of claim 1, wherein the first primary power switch is switched with a first duty cycle and the secondary power switch is switched with a second duty cycle, wherein the first duty cycle and the second duty cycle are fixed and essentially equal.

10. The apparatus of claim 1, wherein the switch controller operates the first primary power switch in the series of converter operating cycles at an operating frequency, wherein the operating frequency is a function of the characteristic resonant frequency.

11. The apparatus of claim 1, wherein the output circuit comprises two secondary windings, each secondary winding comprising a same number of secondary turns.

12. The apparatus of claim 11, wherein:
the first winding is characterized by a first number of turns;
the second winding is characterized by a second number of turns; and
the substantially fixed ratio, $K_{DC}$, is a function of a ratio of the first number of turns to the second number of turns.

13. The apparatus of claim 12, wherein the first and second windings are connected to form a center-tap winding with two terminal ends and a center tap.

14. The apparatus of claim 13, wherein the second winding is the center-tap winding with the two terminal ends and the center tap.

15. The apparatus of claim 14, wherein N is equal to approximately 2, such that the input voltage $V_{IN}$ is approximately equal to the DC source voltage VS minus 2 times the output voltage $V_{OUT}$.

16. The apparatus of claim 15, wherein each of the two terminal ends of the second winding are selectively connected to a common terminal through a respective secondary power switch and the center tap is connected to supply the output voltage $V_{OUT}$ with respect to the common terminal.

17. The apparatus of claim 16, wherein the input circuit includes a second primary power switch, and the first and second primary power switches are connected together to drive a first end of the series resonant circuit.

18. The apparatus of claim 17, wherein the input circuit further comprises at least two additional primary power switches connected together to drive a second end of the series resonant circuit.

19. An method comprising:
providing a switching power converter including an input circuit and an output circuit, the switching power converter being constructed and arranged to convert power from the input circuit to the output circuit at a substantially fixed ratio, $K_{DC}$, at an output current, wherein an input voltage $V_{IN}$ is applied to the input circuit and an output voltage $V_{OUT}$ is produced by the output circuit of the switching power converter, and wherein the substantially fixed ratio can be represented as $K_{DC}=V_{OUT}/V_{IN}$;
the input circuit and the output circuit being coupled by a transformer, the transformer including at least a first winding and a second winding;
the input circuit including a first primary power switch and the first winding;
the output circuit including at least one secondary power switch and the second winding;
the input circuit and at least a portion of the output circuit of the switching power converter being connected in series across a source such that an absolute value of the input voltage $V_{IN}$ applied to the input circuit is approximately equal to the absolute value of a DC source voltage $V_S$ minus a number N times the absolute value of the output voltage $V_{OUT}$, where N is at least 1;
providing a series resonant circuit including the first winding and at least one resonant capacitor connected in series with the first winding, the series resonant circuit having a characteristic resonant frequency and a characteristic resonant period, the first primary power switch being connected to drive the series resonant circuit; and
providing a switch controller adapted to operate the first primary power switch in a series of converter operating cycles, each converter operating cycle characterized by two power transfer intervals of essentially equal duration each interval having a duration less than the characteristic resonant period, during which one or more primary power switches are ON and power is transferred from the input circuit to the output circuit via the transformer.

20. The method of claim 19, wherein the switching power converter is a self-contained assembly adapted to be installed as a unit.

21. The method of claim 19, wherein both the input circuit and the output circuit comprise full-bridge circuits.

22. The method of claim 19, wherein N is equal to approximately 2, such that the input voltage $V_{IN}$ is approximately equal to the DC source voltage VS minus 2 times the output voltage $V_{OUT}$.

23. The method of claim 19, wherein the input circuit includes a second primary power switch, and the first and second primary power switches are connected together to drive a first end of the series resonant circuit.

24. The apparatus of claim 19, wherein the input circuit further comprises at least two additional primary power switches connected together to drive a second end of the series resonant circuit.

25. An apparatus comprising:
a switching power converter including an input circuit and an output circuit, the switching power converter being constructed and arranged to convert power from the input circuit to the output circuit at a substantially fixed ratio, $K_{DC}$, at an output current, wherein an input voltage $V_{IN}$ is applied to the input circuit and an output voltage $V_{OUT}$ is produced by the output circuit of the switching power converter;

the input circuit and the output circuit being coupled by a transformer, the transformer including at least a first winding and a second winding;

the input circuit including a first primary power switch and the first winding;

the output circuit including at least one secondary power switch and the second winding;

the input circuit and at least a portion of the output circuit of the switching power converter being connected in series across a source;

a series resonant circuit including the first winding and at least one resonant capacitor connected in series with the first winding, the series resonant circuit having a characteristic resonant frequency and a characteristic resonant period, the first primary power switch being connected to drive the series resonant circuit; and a switch controller adapted to operate the first primary power switch in a series of converter operating cycles, each converter operating cycle characterized by two power transfer intervals of essentially equal duration each interval having a duration less than the characteristic resonant period, during which one or more primary power switches are ON and power is transferred from the input circuit to the output circuit via the transformer.

26. The apparatus of claim 25, wherein the input circuit includes a second primary power switch, and the first and second primary power switches are connected together to drive a first end of the series resonant circuit.

27. The apparatus of claim 26, wherein the input circuit further comprises at least two additional primary power switches connected together to drive a second end of the series resonant circuit.

28. The apparatus of claim 25, wherein:
the first winding is characterized by a first number of turns;
the second winding is characterized by a second number of turns; and
the first number of turns is equal to the second number of turns.

29. The apparatus of claim 28, wherein the first and second windings are connected to form a center-tap winding with two terminal ends and a center tap.

30. The apparatus of claim 29, wherein the terminal ends of the first and second windings are selectively connected to a common terminal through respective secondary power switches.

31. The apparatus of claim 30, wherein the center tap is connected to supply the output voltage $V_{OUT}$ with respect to the common terminal.

32. The apparatus of claim 29, wherein the bus converter is a self-contained assembly adapted to be installed as a unit.

33. The apparatus of claim 32, wherein the output circuit includes a plurality of power switches, wherein the plurality of power switches in the output circuit are controlled to turn ON and OFF at times of essentially zero voltage.

* * * * *